(12) United States Patent
Tanaka

(10) Patent No.: US 12,172,626 B2
(45) Date of Patent: Dec. 24, 2024

(54) CONTROL DEVICE, STORAGE MEDIUM AND CONTROL METHOD

(71) Applicant: HONDA MOTOR CO., LTD., Tokyo (JP)

(72) Inventor: Masaki Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 330 days.

(21) Appl. No.: 17/683,407

(22) Filed: Mar. 1, 2022

(65) Prior Publication Data

US 2022/0306078 A1    Sep. 29, 2022

(30) Foreign Application Priority Data

Mar. 26, 2021   (JP) ................................ 2021-052623

(51) Int. Cl.
*B60W 20/20*      (2016.01)
*B60L 1/00*        (2006.01)
(Continued)

(52) U.S. Cl.
CPC ............. *B60W 20/20* (2013.01); *B60L 1/003* (2013.01); *B60W 40/105* (2013.01)

(58) Field of Classification Search
CPC ..... B60W 20/20; B60W 40/105; B60L 1/003; B60L 15/025; B60L 3/0038
See application file for complete search history.

(56) References Cited

U.S. PATENT DOCUMENTS

2004/0061461 A1    4/2004  Tajima et al.
2011/0080125 A1*   4/2011  Shimada ............. H02P 21/0003
                                            318/400.09

(Continued)

FOREIGN PATENT DOCUMENTS

EP    2360831 A1 *  8/2011  ............ B60L 15/025
EP    2725705 B1 * 11/2018  ........... B62D 5/0463

(Continued)

OTHER PUBLICATIONS

Japanese Office Action for Japanese Patent Application No. 2021-052623 mailed Jul. 16, 2024.

*Primary Examiner* — Yonel Beaulieu
(74) *Attorney, Agent, or Firm* — Amin, Turocy & Watson, LLP

(57) ABSTRACT

A control device executes: controlling a voltage in a d-axis direction and a voltage in a q-axis direction applied to a rotating electric machine driven by an electric power supplied from an inverter, to which a magnetic pole position detector for detecting a magnetic pole position of the rotor is attached, and which includes a stator for generating a magnetic field using a winding; acquiring q-axis current data indicating a component in the q-axis direction of a current flowing through the rotating electric machine when a component in the d-axis direction of the voltage applied to the rotating electric machine is equal to or less than a predetermined voltage; and determining, based on the q-axis current data, a correction amount of the magnetic pole position satisfying a condition that a current indicated by the q-axis current data is equal to or less than a predetermined current and correcting the magnetic pole position based on the correction amount.

11 Claims, 16 Drawing Sheets

(51) Int. Cl.
 _B60W 40/10_ (2012.01)
 _B60W 40/105_ (2012.01)

(56) References Cited

U.S. PATENT DOCUMENTS

2014/0054103 A1\* 2/2014 Kezobo ................ G01R 31/343
 180/446
2021/0067069 A1 3/2021 Iezawa et al.

FOREIGN PATENT DOCUMENTS

| JP | 2004-129359 | 4/2004 |
| JP | 2004-266935 | 9/2004 |
| WO | 2019/207754 | 10/2019 |

\* cited by examiner

CONTROL DEVICE, STORAGE MEDIUM AND CONTROL METHOD

CROSS-REFERENCE TO RELATED APPLICATION

This application claims priority to and the benefit from Japanese Patent Application No. 2021-052623, filed on Mar. 26, 2021, the contents of which are hereby incorporated by reference into the present application.

BACKGROUND

Field of the Invention

The present invention relates to a control device, a storage medium and a control method.

Description of Related Art

Development of vehicles powered by a rotating electric machine, which has been used as an electric motor, such as electric vehicles (EV), hybrid vehicles (HV), and fuel cell vehicles (FCV) has progressed. The rotating electric machine mounted on these vehicles includes, for example, a magnetic pole position detector configured using a Hall element, an encoder, or the like.

The magnetic pole position detector provided in the rotating electric machine detects the magnetic pole position of a rotor, and the phase of the armature application voltage is operated according to the detected magnetic pole position. However, due to the alignment at the time of assembling the magnetic pole position detector, the manufacturing accuracy of the magnetic pole position detector itself, and the like, the magnetic pole position detected by the magnetic pole position detector may have an error with respect to the actual magnetic pole position.

Therefore, there is a demand for a technique for correcting an error in the magnetic pole position detected by the magnetic pole position detector. As a technique for performing such a correction, for example, a synchronous motor control device disclosed in Japanese Unexamined Patent Application, First Publication No. 2004-266935 can be mentioned.

The synchronous motor control device corrects the deviation of the rotational position (magnetic pole position) related to a rotational position detector (magnetic pole position detector) of the synchronous motor that is vector-controlled, and has a current command generator, a current controller, a phase correction amount detector, an adder, and a voltage converter. When a phase correction command is input, the current command generator ignores a torque command and sets a d-axis current command and a q-axis current command to zero, respectively. The current controller outputs d-axis and q-axis voltage commands based on the d-axis and q-axis current commands. The phase correction amount detector obtains an offset amount that sets the d-axis voltage command to zero when the phase correction command is input and the d-axis voltage command is not zero. The adder adds the rotor position angle and the offset amount. The voltage converter obtains a three-phase voltage command based on this addition value and the d-axis and q-axis voltage commands.

SUMMARY

The above-mentioned synchronous motor control device sets the d-axis current command and the q-axis current command to zero in order to correct the error in the magnetic pole position. However, when the rotation speed of the rotating electric machine is relatively high, the counter-electromotive force of the armature becomes large, so it is necessary to pass a negative d-axis current to cancel the counter-electromotive force, and the d-axis current cannot be reduced to zero. As a result, in the above-mentioned technique, when the rotation speed of the rotating electric machine is relatively high, it may not be possible to correct the error in the magnetic pole position.

The present invention has been made in consideration of such circumstances, and one of the objects thereof is to provide a control device, a storage medium, and a control method capable of correcting an error in the magnetic pole position of a rotor even when the rotation speed of a rotating electric machine is relatively high.

The control device, storage medium, and control method according to the present invention have the following configurations.

(1) A control device according to an aspect of the present invention is a control device including: a storage medium for storing computer-readable instructions; and a processor connected to the storage medium, the processor executing the computer-readable instructions to execute: controlling a voltage in a d-axis direction and a voltage in a q-axis direction applied to a rotating electric machine driven by an electric power supplied from an inverter, in which a d-axis which is an axis indicating a magnetization direction of a magnet of a rotor including a permanent magnet and a q-axis which is an axis orthogonal to the d-axis are defined, to which a magnetic pole position detector for detecting a magnetic pole position of the rotor is attached, and which includes a stator for generating a magnetic field using a winding; acquiring q-axis current data indicating a component in the q-axis direction of a current flowing through the rotating electric machine when a component in the d-axis direction of the voltage applied to the rotating electric machine is equal to or less than a predetermined voltage; and determining a correction amount of the magnetic pole position satisfying a condition that a current indicated by the q-axis current data is equal to or less than a predetermined current based on the q-axis current data and correcting the magnetic pole position based on the correction amount.

(2) In aspect (1), the processor controls the inverter so that the component in the d-axis direction of the voltage applied to the rotating electric machine when the rotor is rotated by an external force applied from the outside of the rotating electric machine is equal to or less than the predetermined voltage.

(3) In aspect (1), the processor acquires angular velocity data indicating an angular velocity of the rotor a plurality of times, the processor determines whether a state in which the angular velocity of the rotor is within a predetermined range has continued for a predetermined period or longer based on a plurality of pieces of angular velocity data, and determines the correction amount when it is determined that the state in which the angular velocity of the rotor is within the predetermined range has continued for the predetermined period or longer.

(4) In aspect (1), the processor further acquires d-axis current data indicating a component in the d-axis direction of the current flowing through the rotating electric machine when the component in the d-axis direction of the voltage applied to the rotating electric machine is equal to or less than the predetermined voltage, and the processor determines the correction amount based on the d-axis current data in addition to the q-axis current data.

(5) In aspect (4), the processor further acquires angular velocity data indicating the angular velocity of the rotor, d-axis inductance data indicating a component in the d-axis direction of the inductance of the rotating electric machine, q-axis inductance data indicating a component in the q-axis direction of the inductance of the rotating electric machine, and voltage radius data indicating a voltage radius of the rotating electric machine, and the processor determines the correction amount using Equation (1).

[Math. 1]

$$\theta_{ofs} = \tan^{-1}(\omega L_q i_q'/(v - \omega L_d i_d')) \quad (1)$$

$\theta_{ofs}$: the correction amount of the magnetic pole position
$\omega$: the angular velocity of the rotor
$L_d$: the component in the d-axis direction of the inductance of the rotating electric machine
$L_q$: the component in the q-axis direction of the inductance of the rotating electric machine
$i_d'$: the current indicated by the d-axis current data
$i_q'$: the current indicated by the q-axis current data
$v$: the voltage radius (6) In aspect (1), the processor acquires the q-axis current data at least once, and the processor arbitrarily determines a provisional correction amount of the magnetic pole position, determines whether the current indicated by the q-axis current data is equal to or less than a predetermined current each time the q-axis current data is acquired by the processor, and determines the provisional correction amount as the correction amount when it is determined that the current indicated by the q-axis current data is equal to or less than the predetermined current.

(7) In aspect (6), the processor further acquires d-axis current data indicating a component in the d-axis direction of the current flowing through the rotating electric machine when it is determined that the current indicated by the q-axis current data is equal to or less than the predetermined current, and the processor corrects the provisional correction amount based on the current indicated by the d-axis current data and an electrical resistance of the winding, and determines the provisional correction amount corrected based on the current indicated by the d-axis current data and the electrical resistance of the winding as the correction amount.

(8) In aspect (7), the processor corrects the provisional correction amount using Equation (2).

[Math. 2]

$$\Delta\theta_{ofs} = \tan^{-1}(ri_d'/V) \quad (2)$$

$\Delta\theta_{ofs}$: contribution to the error in the magnetic pole position, of a product of the current indicated by the d-axis current data and the electrical resistance of the winding
$r$: the electrical resistance of the winding of the stator
$i_d'$: the current indicated by the d-axis current data
$v$: the voltage radius (9) In aspect (1), the processor acquires the q-axis current data at least once, and the processor arbitrarily determines a provisional correction amount of the magnetic pole position, determines whether a current indicated by the q-axis current data is equal to or less than a predetermined current each time the q-axis current data is acquired by the processor, and redetermines the provisional correction amount when it is determined that the current indicated by the q-axis current data exceeds the predetermined current.

(10) A computer-readable non-transitory storage medium according to an aspect of the present invention stores a control programs for causing a computer to realize: a voltage control function of controlling a voltage in a d-axis direction and a voltage in a q-axis direction applied to a rotating electric machine driven by an electric power supplied from an inverter, in which a d-axis which is an axis indicating a magnetization direction of a magnet of a rotor including a permanent magnet and a q-axis which is an axis orthogonal to the d-axis are defined, to which a magnetic pole position detector for detecting a magnetic pole position of the rotor is attached, and which includes a stator for generating a magnetic field using a winding; a data acquisition function of acquiring q-axis current data indicating a component in the q-axis direction of a current flowing through the rotating electric machine when a component in the d-axis direction of the voltage applied to the rotating electric machine is equal to or less than a predetermined voltage; and a magnetic pole position correction function of determining a correction amount of the magnetic pole position satisfying a condition that a current indicated by the q-axis current data is equal to or less than a predetermined current based on the q-axis current data and correcting the magnetic pole position based on the correction amount.

(11) A control method according to an aspect of the present invention is a control method for causing a computer to execute: a voltage control function of controlling a voltage in a d-axis direction and a voltage in a q-axis direction applied to a rotating electric machine driven by an electric power supplied from an inverter, in which a d-axis which is an axis indicating a magnetization direction of a magnet of a rotor including a permanent magnet and a q-axis which is an axis orthogonal to the d-axis are defined, to which a magnetic pole position detector for detecting a magnetic pole position of the rotor is attached, and which includes a stator for generating a magnetic field using a winding; a data acquisition function of acquiring q-axis current data indicating a component in the q-axis direction of a current flowing through the rotating electric machine when a component in the d-axis direction of the voltage applied to the rotating electric machine is equal to or less than a predetermined voltage; and a magnetic pole position correction function of determining a correction amount of the magnetic pole position satisfying a condition that a current indicated by the q-axis current data is equal to or less than a predetermined current based on the q-axis current data and correcting the magnetic pole position based on the correction amount.

According to (1) to (11), the control device does not need to execute the control to make the current flowing in the q-axis direction zero. Therefore, the control device can correct the magnetic pole position even when the rotation speed of the rotating electric machine is relatively high.

According to (2), the correction of the vehicle system can be performed before use by correcting the magnetic pole position at the time of idling after the engine is started in the state where the engine and the rotating electric machine are connected.

According to (3), the control device determines the correction amount of the magnetic pole position in a state where the angular velocity of the rotor is stable to a certain extent or more. Therefore, since the control device determines the correction amount in a state where the angular velocity of the rotor, the temperature of the rotating electric machine, and the like required for determining the correction amount of the magnetic pole position are stable, it is possible to determine a more suitable correction amount.

According to (4) or (5), the control device determines the correction amount analytically based on the component in the q-axis direction of the current flowing through the rotating electric machine, the component in the d-axis direction of the current flowing through the rotating electric machine, and the like. Therefore, the control device can more accurately determine the correction amount of the magnetic pole position.

According to (6), when it is determined that the component in the q-axis direction of the current flowing through the rotating electric machine is equal to or less than a predetermined current, the control device determines the provisional correction amount as the correction amount without further correcting the provisional correction amount. On the other hand, according to (9), when it is determined that the component in the q-axis direction of the current flowing through the rotating electric machine exceeds a predetermined current, the control device redetermines the provisional correction amount. Therefore, the control device can determine the correction amount with higher accuracy according to the state such as the temperature of the rotating electric machine, which is determined by the environment in which the rotating electric machine is used.

According to (7) or (8), the control device determines the correction amount in consideration of the influence on the correction amount of the magnetic pole position, of the electrical resistance of the winding of the stator and the current flowing in the d-axis direction. Therefore, the control device can determine a more accurate correction amount in consideration of these effects.

DESCRIPTION OF EMBODIMENTS

Hereinafter, embodiments of the control device, storage medium, and control method according to the present invention will be described with reference to the drawings.

First Embodiment

Figure 1:
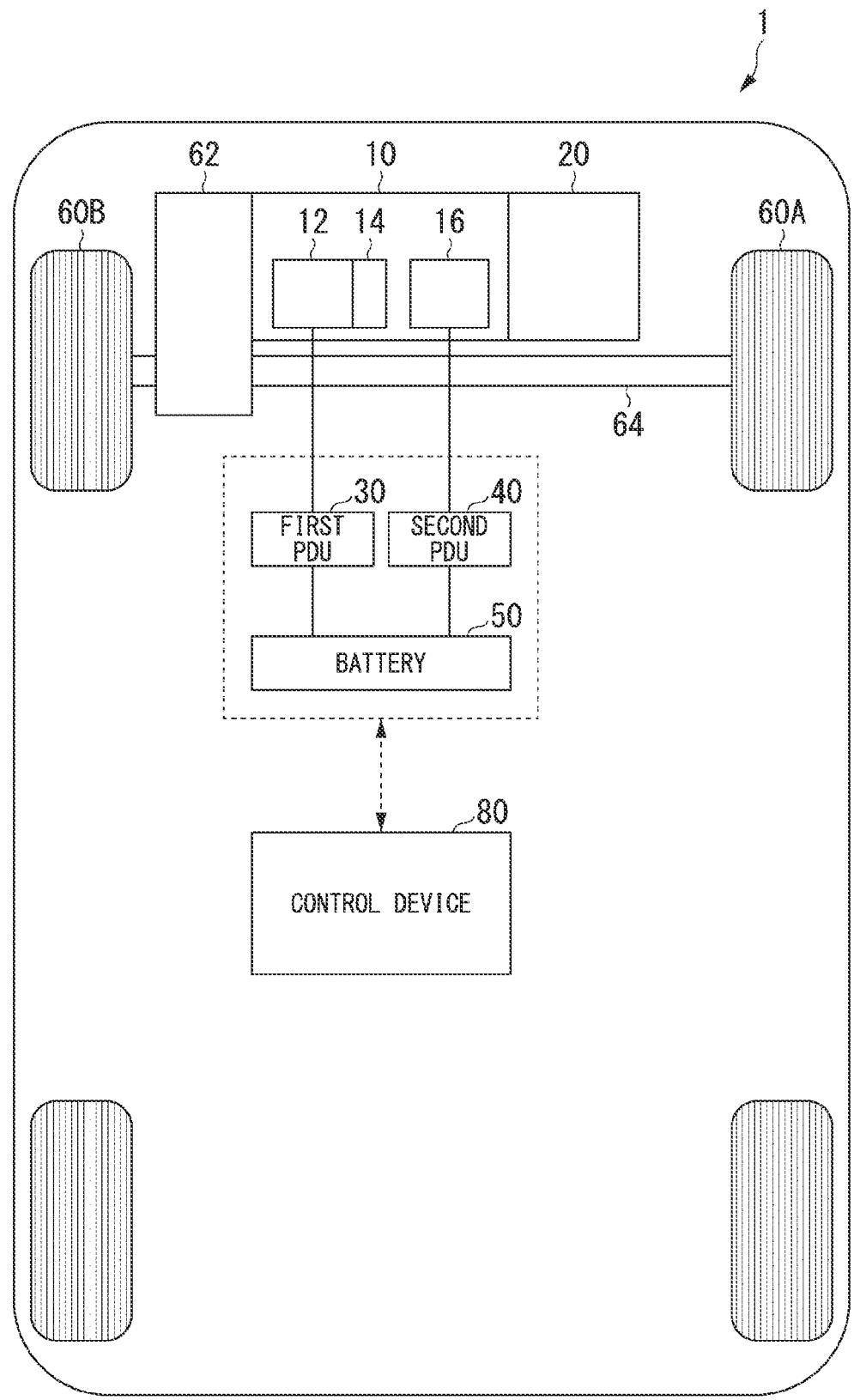
FIG. 1 is a diagram showing an example of a vehicle according to a first embodiment.

First, a vehicle according to the first embodiment will be described with reference to FIGS. 1 to 6. FIG. 1 is a diagram showing an example of a vehicle according to the first embodiment. As shown in FIG. 1, a vehicle 1 includes, for example, a rotating electric generator 10, an engine 20, a first power drive unit (PDU) 30, a second PDU 40, a battery 50, a drive wheel 60A, a drive wheel 60B, a transmission 62, an axle 64, and a control device 80.

The rotating electric generator 10 includes a rotating electric machine 12, a magnetic pole position detector 14, and a generator 16.

The rotating electric machine 12 includes a rotor that generates a magnetic field by a permanent magnet and a stator that generates a magnetic field by a winding, and functions as an electric motor that supplies power to the vehicle 1. For example, the rotating electric machine 12 is a three-phase synchronous electric motor driven by an alternating current supplied from at least one of the first PDU 30 and the generator 16. The power generated by the rotating electric machine 12 is transmitted to the axle 64 to which the drive wheels 60A and 60B are attached via the transmission 62.

Further, in the rotating electric machine 12, the d-axis and the q-axis are defined. The d-axis is an axis indicating the magnetization direction of the rotor, and the q-axis is an axis that is electrically and magnetically orthogonal to the d-axis. That is, the d-axis and the q-axis are the coordinate axes of the synchronous rotation coordinates of the rotor, and rotate together with the rotor.

The magnetic pole position detector 14 is attached to the rotating electric machine 12 and detects the magnetic pole position of the rotor included in the rotating electric machine 12. The generator 16 generates electric power by rotating in response to the power generated by the engine 20. The electric power generated by the generator 16 is supplied to a battery 50 via the second PDU 40. The generator 16 may be omitted. In this case, instead of the generator 16, the rotating electric machine 12 generates electric power and supplies electric power to the battery 50.

Figure 2:
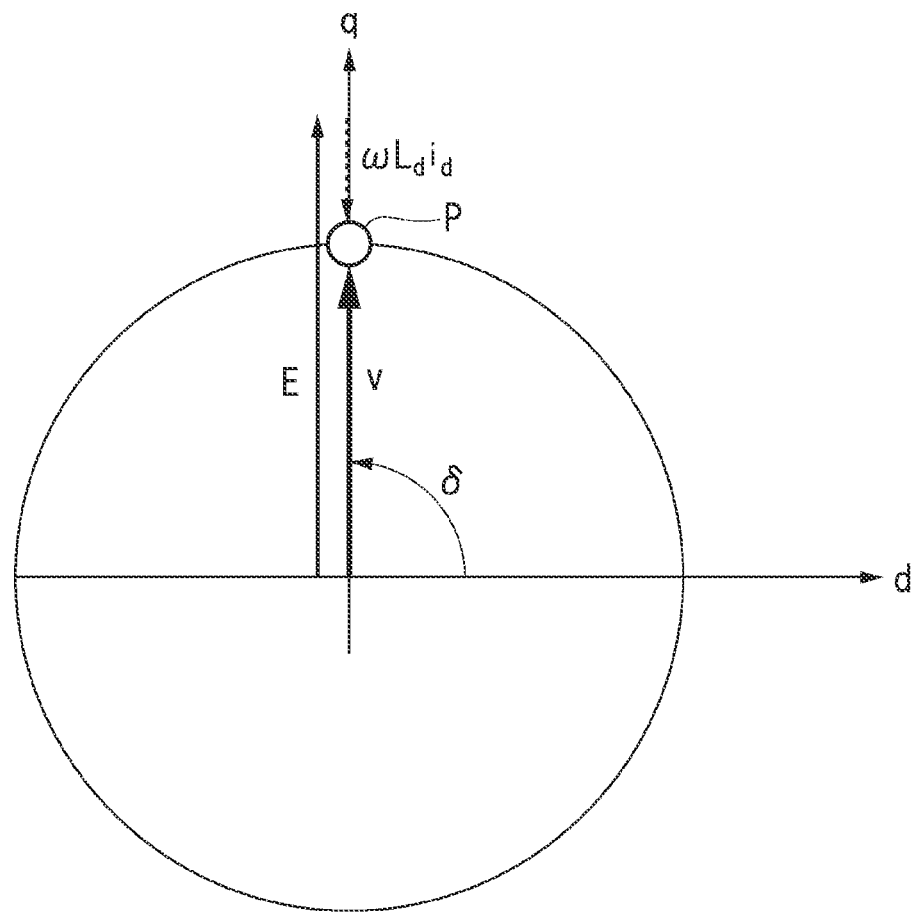
FIG. 2 is a vector diagram showing an example of a counter-electromotive voltage generated when an error in the magnetic pole position detected by a magnetic pole position detector according to the first embodiment is zero.

FIG. 2 is a vector diagram showing an example of a counter-electromotive voltage generated when an error in the magnetic pole position detected by the magnetic pole position detector according to the first embodiment is zero. When an error in the magnetic pole position detected by the magnetic pole position detector 14 is zero, the rotating electric machine 12 is operated at a voltage phase of δ=90 degrees, and the phase current of the three-phase alternating current supplied to the rotating electric machine 12 becomes zero, the counter-electromotive voltage represented by a vector E shown in FIG. 2 is generated. Further, in such a case, the d-axis and the q-axis recognized by the control device 80 coincide with the d-axis and the q-axis shown in FIG. 2, respectively. Therefore, in such a case, the counter-electromotive voltage has a predetermined voltage in which the component in the d-axis direction is zero and the component in the q-axis direction is not zero.

Figure 3:
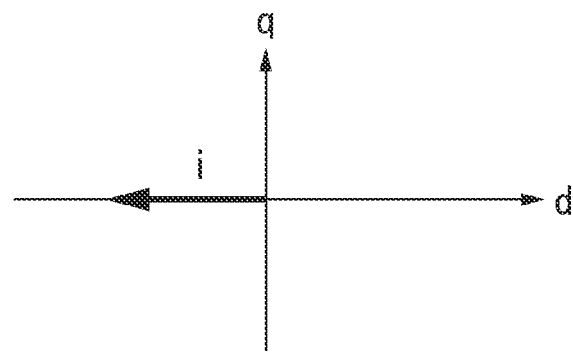
FIG. 3 is a vector diagram showing an example of a current flowing through a rotating electric machine when an error in the magnetic pole position detected by the magnetic pole position detector according to the first embodiment is zero.

FIG. 3 is a vector diagram showing an example of a current flowing through a rotating electric machine when an error in the magnetic pole position detected by the magnetic pole position detector according to the first embodiment is zero. When an error in the magnetic pole position detected by the magnetic pole position detector 14 is zero, the rotating electric machine 12 is operated at the voltage phase of δ=90 degrees, and the phase current of the three-phase alternating current supplied to the rotating electric machine 12 becomes zero, the current represented by a vector i shown in FIG. 3 is generated. This current generates a magnetic field in the same direction as the magnetic field generated by the rotor located on the d-axis or a magnetic field in the direction opposite to the direction.

Figure 4:
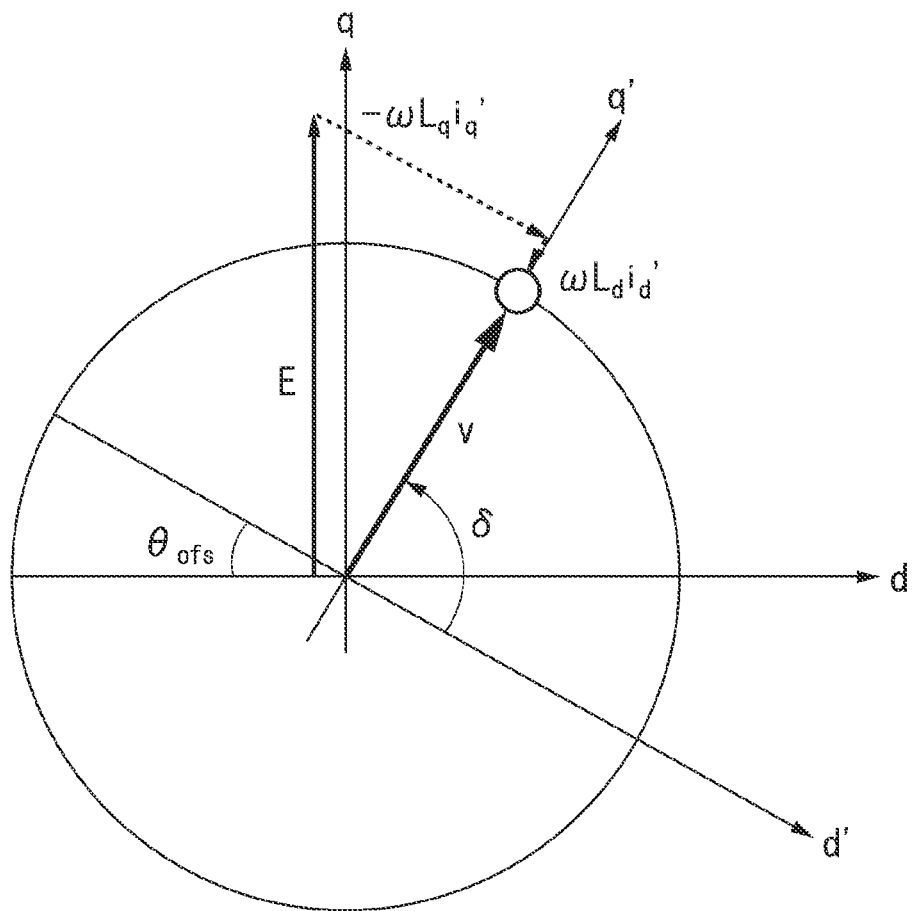
FIG. 4 is a vector diagram showing an example of a counter-electromotive voltage generated when an error in the magnetic pole position detected by the magnetic pole position detector according to the first embodiment is not zero.

FIG. 4 is a vector diagram showing an example of a counter-electromotive voltage generated when an error in the magnetic pole position detected by the magnetic pole position detector according to the first embodiment is not zero. When an error in the magnetic pole position detected by the magnetic pole position detector 14 is not zero, the rotating electric machine 12 is operated at the voltage phase of δ=90 degrees, and the phase current of the three-phase alternating current supplied to the rotating electric machine 12 becomes zero, the counter-electromotive voltage represented by a vector E shown in FIG. 4 is generated. Further, in such a case, the d-axis and the q-axis recognized by the control device 80 are the d'-axis and the q'-axis shown in FIG. 4, respectively. The d'-axis is an axis obtained by rotating the d-axis counterclockwise by the error $\theta_{ofs}$ in the magnetic pole position detected by the magnetic pole position detector 14. The q'-axis is an axis obtained by rotating the q-axis counterclockwise by the error $\theta_{ofs}$ in the magnetic pole position detected by the magnetic pole position detector 14. Therefore, in such a case, the counter-electromotive voltage is a predetermined voltage in which neither the component in the direction of the d'-axis nor the component in the direction of the q'-axis is zero.

Figure 5:
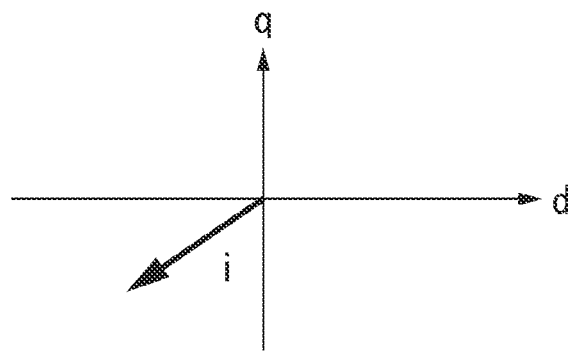
FIG. 5 is a vector diagram showing an example of a current flowing through a rotating electric machine when an error in the magnetic pole position detected by the magnetic pole position detector according to the first embodiment is not zero.

FIG. 5 is a vector diagram showing an example of a current flowing through a rotating electric machine when an error in the magnetic pole position detected by the magnetic pole position detector according to the first embodiment is not zero. When an error in the magnetic pole position detected by the magnetic pole position detector 14 is zero, the rotating electric machine 12 is operated at the voltage phase of δ=90 degrees, and the phase current of the three-phase alternating current supplied to the rotating electric machine 12 becomes zero, the current represented by a vector i shown in FIG. 5 is generated. This current generates a magnetic field that also has a component in the q-axis direction.

Figure 6:
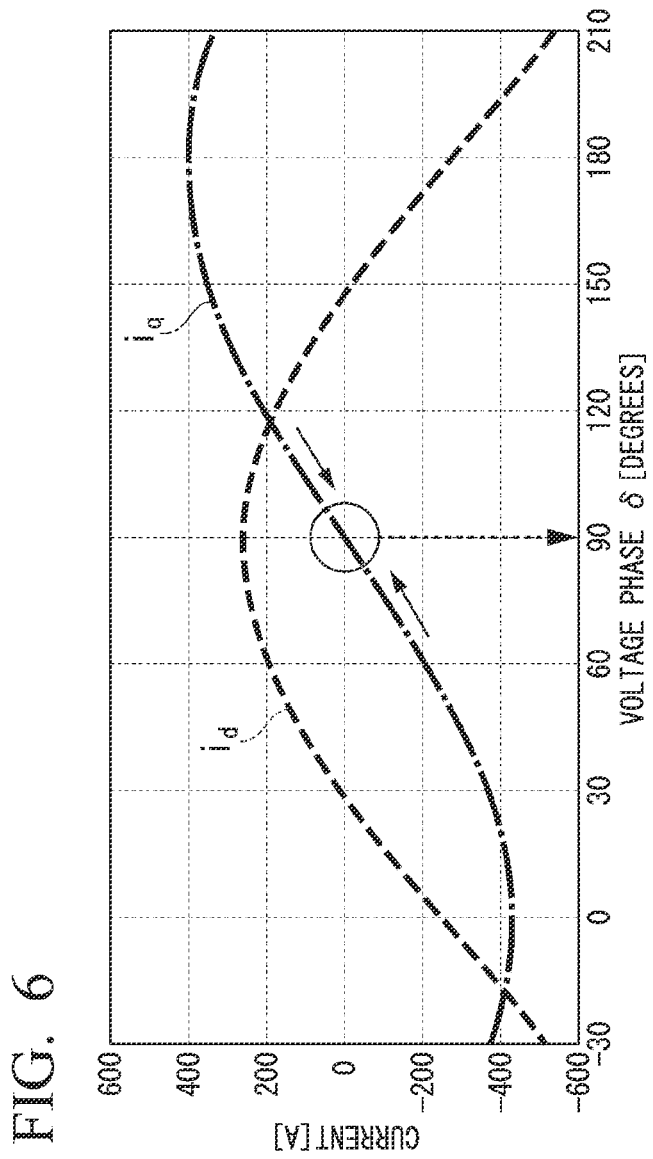
FIG. 6 is a diagram showing an example of the relationship between the phase of the voltage applied to the rotating electric machine according to the first embodiment and the current flowing through the rotating electric machine.

FIG. 6 is a diagram showing an example of the relationship between the phase of the voltage applied to the rotating electric machine according to the first embodiment and the current flowing through the rotating electric machine. In FIG. 6, the horizontal axis represents the voltage phase and the vertical axis represents the current. Further, FIG. 6 shows a component is in the d-axis direction and a component $i_q$ in the q-axis direction of the current flowing through the rotating electric machine 12 when an error in the magnetic pole position detected by the magnetic pole position detector 14 is zero.

As shown in FIG. 6, when the voltage phase is δ=90 degrees and the error in the magnetic pole position detected by the magnetic pole position detector 14 is zero, the component $i_q$ in the q-axis direction of the current flowing through the rotating electric machine 12 becomes zero. On the other hand, when an error in the magnetic pole position detected by the magnetic pole position detector 14 is not zero, the voltage phase δ deviates from 90 degrees, so that the component $i_q$ in the q-axis direction of the current flowing through the rotating electric machine 12 becomes a current other than zero.

That is, based on the contents described with reference to FIGS. 2 to 6, it can be seen that the component $i_q$ in the q-axis direction of the current flowing through the rotating electric machine 12 becomes zero when an error in the magnetic pole position detected by the magnetic pole position detector 14 is zero, and the component $i_q$ in the q-axis direction of the current flowing through the rotating electric machine 12 becomes a current other than zero when an error in the magnetic pole position detected by the magnetic pole position detector 14 is not zero.

Returning to FIG. 1, the engine 20 supplies power to the vehicle 1. The power generated by the engine 20 is transmitted to the axle 64 via the transmission 62. Alternatively, the power generated by the engine 20 is transmitted to the generator 16.

Figure 7:
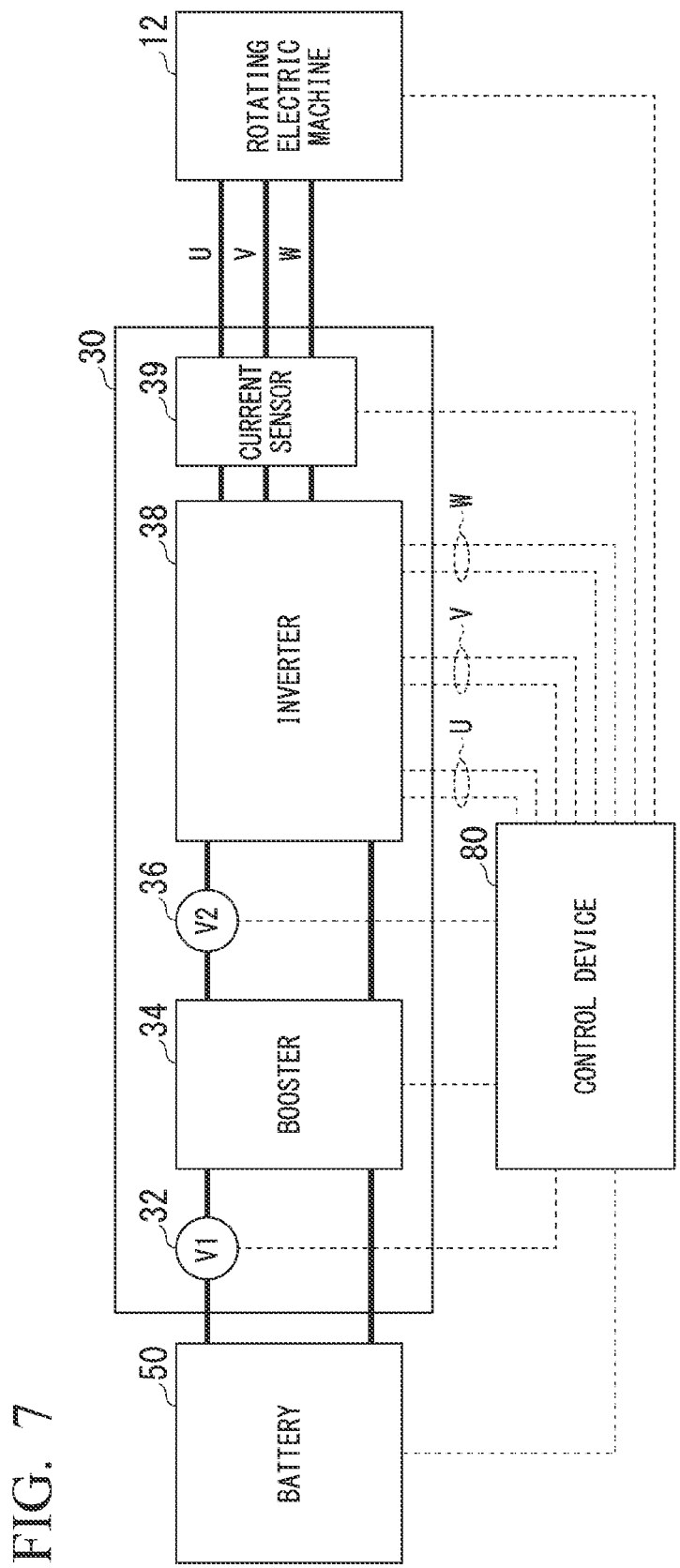
FIG. 7 is a diagram showing an example of a first PDU according to the first embodiment and a configuration around the first PDU.

Next, the first PDU according to the first embodiment and the configuration therearound will be described with reference to FIG. 7. FIG. 7 is a diagram showing an example of the first PDU according to the first embodiment and the configuration around the first PDU. As shown in FIG. 7, the first PDU 30 includes a first voltage sensor 32, a booster 34, a second voltage sensor 36, an inverter 38, and a current sensor 39.

The first voltage sensor 32 is connected between the battery 50 and the booster 34, and measures the voltage of the DC power input to the booster 34. The booster 34 amplifies the voltage and supplies it to the inverter 38. The second voltage sensor 36 measures the DC voltage whose voltage is amplified by the booster 34. The inverter 38 converts the DC power supplied from the booster 34 into AC power and supplies it to the rotating electric machine 12. The current sensor 39 detects the U-phase, V-phase, and W-phase currents supplied to the rotating electric machine 12.

Next, a control method of the inverter according to the first embodiment will be described with reference to FIGS. 8 to 10. Examples of the control method of the inverter 38 include pulse width modulation control and one-pulse control. The pulse width modulation control is, for example, a sinusoidal pulse width modulation control or an over-modulation pulse width modulation control. The sinusoidal pulse width modulation control, the over-modulation pulse width modulation control, and the one-pulse control are all control methods for switching between the conduction state and the non-conduction state of the switching element included in the inverter 38.

Figure 8:
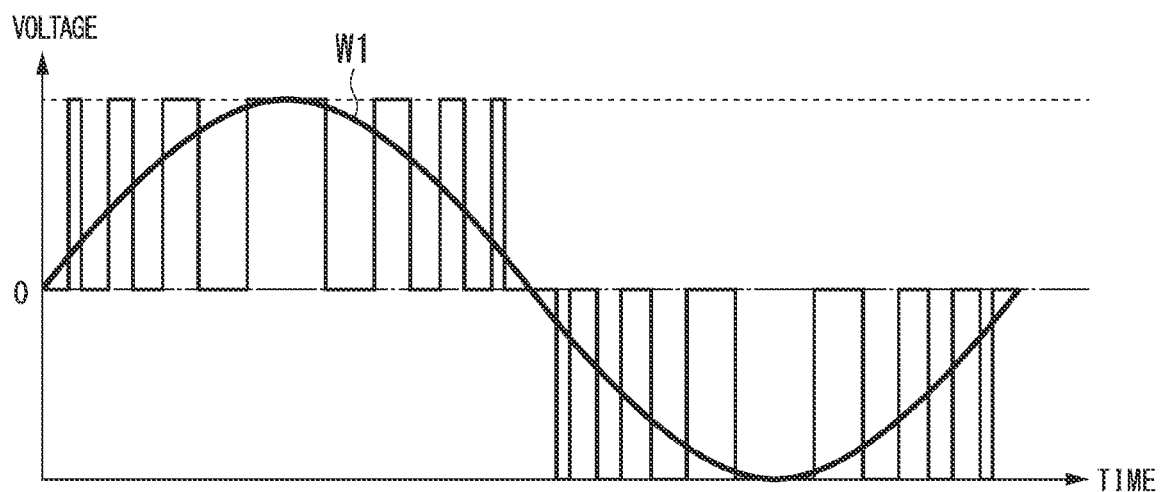
FIG. 8 is a diagram showing an example of a voltage waveform output by an inverter according to the first embodiment when sinusoidal pulse width modulation control is executed.

FIG. 8 is a diagram showing an example of the waveform of the voltage output by the inverter according to the first embodiment when the sinusoidal pulse width modulation control is executed. In FIG. 8, the vertical axis represents voltage and the horizontal axis represents time.

The sinusoidal pulse width modulation control is a control method for supplying an AC voltage equivalent to the AC voltage represented by the sine wave W1 shown in FIG. 8 to the rotating electric machine 12 by adjusting the duty ratio of the voltage pulse. Further, the sinusoidal pulse width modulation control controls the amplitude and phase of the AC voltage by feedback control with respect to the AC current supplied to the rotating electric machine 12. Further, the sinusoidal pulse width modulation control maintains linearity with the voltage and the pulse width modulation control signal by performing pulse width modulation in a state where the amplitude of the AC voltage represented by the sine wave W1 is equal to or less than the amplitude of the voltage applied between the lines of the rotating electric machine 12. Further, since the sinusoidal pulse width modulation control is control that maintains the linearity, the number of times switching between the conduction state and the non-conduction state of the switching element included in the inverter 38 is executed is more than the over-modulation pulse width modulation control and the one-pulse control.

Figure 9:
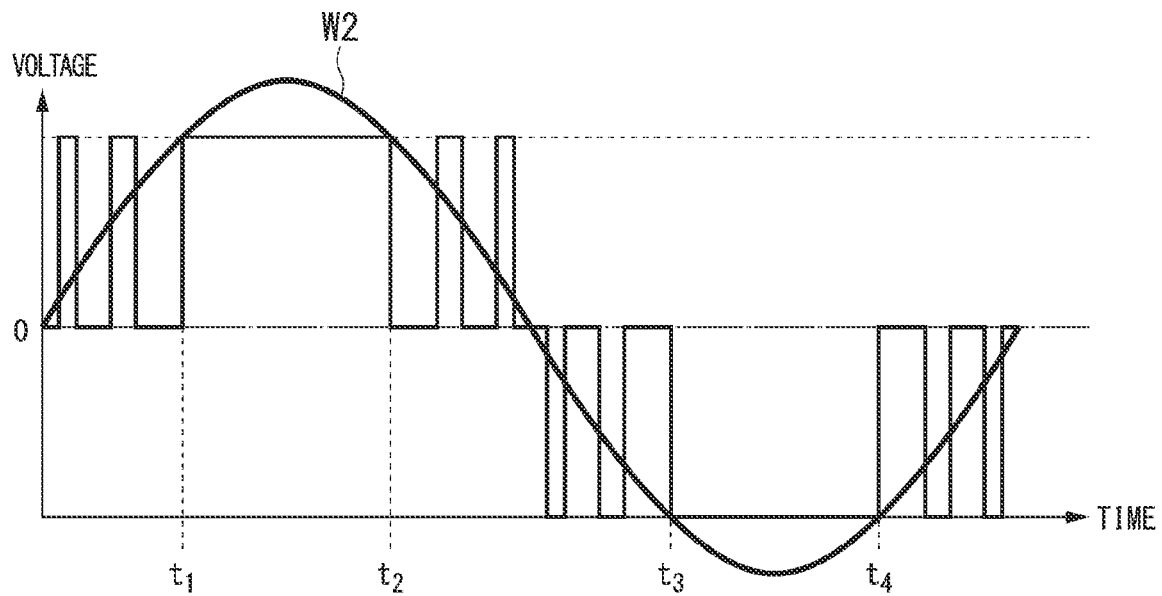
FIG. 9 is a diagram showing an example of a voltage waveform output by an inverter according to the first embodiment when over-modulation pulse width modulation control is executed.

FIG. 9 is a diagram showing an example of the waveform of the voltage output by the inverter according to the first embodiment when the over-modulation pulse width modulation control is executed. In FIG. 9, the vertical axis represents voltage and the horizontal axis represents time.

The over-modulation pulse width modulation control controls the amplitude and phase of the AC voltage by feedback control with respect to the AC current supplied to the rotating electric machine 12. Further, the over-modulation pulse width modulation control allows non-linearity between the voltage and the pulse width modulated signal by performing pulse width modulation in a state where the amplitude of the AC voltage represented by the sine wave W2 shown in FIG. 9 is larger than the amplitude of the voltage applied between the lines of the rotating electric machine 12. In this way, the over-modulation pulse width modulation control distorts the inter-line voltage of the rotating electric machine 12 which is a pseudo sine wave so as to approach a rectangular wave, so that voltage utilization rate is higher than the case where the inter-line voltage is a pseudo sine wave.

As shown in FIG. 9, in the non-linear period from time $t_1$ to time $t_2$ and the non-linear period from time $t_3$ to time $t_4$, the absolute value of the voltage represented by the sine wave W2 is larger than the absolute value of the voltage actually applied. That is, in these two non-linear periods, the inter-line voltage of the rotating electric machine 12 approaches from a sinusoidal shape to a rectangular shape, and the voltage utilization rate increases. Further, since the over-modulation pulse width modulation control is control that does not maintain the linearity between the voltage and the pulse width modulation control signal, the number of times switching is executed is smaller than that of the sinusoidal pulse width modulation control.

Figure 10:
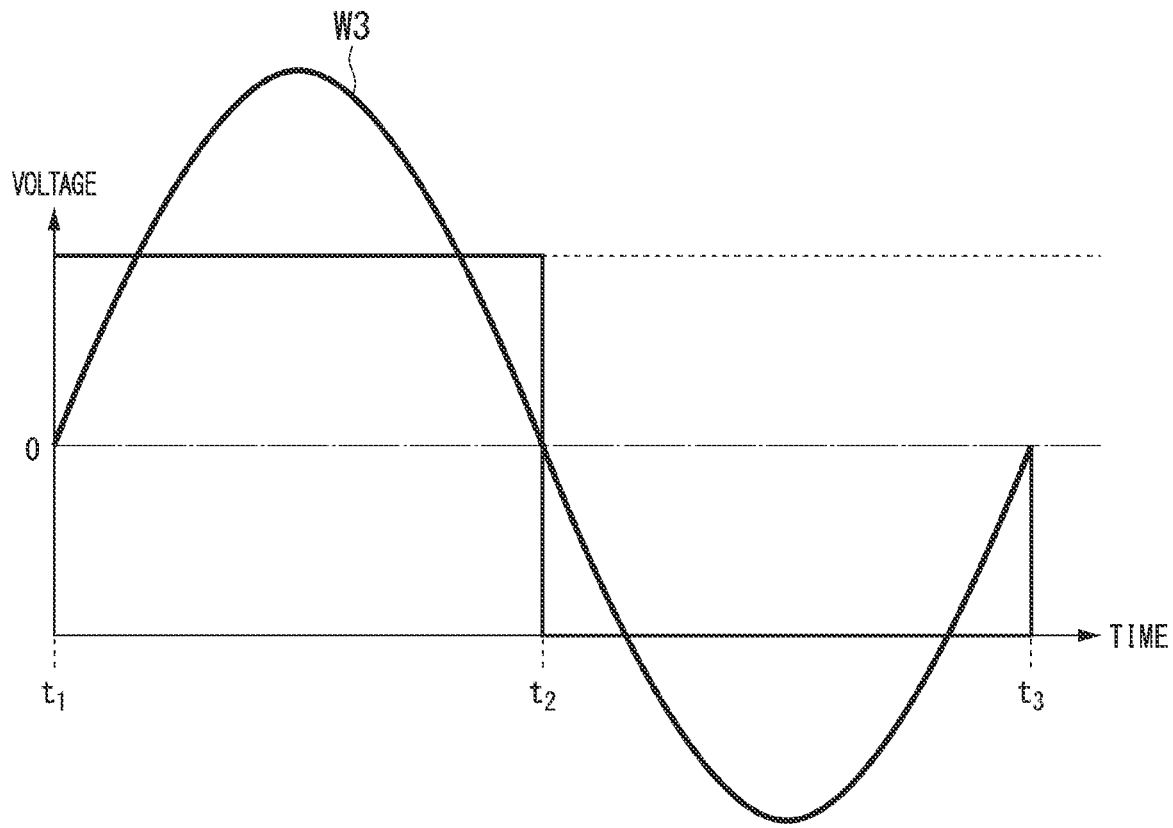
FIG. 10 is a diagram showing an example of a voltage waveform output by an inverter according to the first embodiment when one-pulse control is executed.

FIG. 10 is a diagram showing an example of the waveform of the voltage output by the inverter according to the first embodiment when the one-pulse control is executed. In FIG. 10, the vertical axis represents voltage and the horizontal axis represents time.

One-pulse control executes switching twice in each period. For example, as shown in FIG. 10, switching is executed at two time points, time $t_1$ and time $t_2$, in the period from time $t_1$ to time $t_3$ equal to the period of the sine wave W3. In this way, the one-pulse control controls the amplitude and phase of the AC voltage by feedback control with respect to the AC voltage supplied to the rotating electric machine 12. Further, comparing FIGS. 9 and 10, it can be seen that the one-pulse control can further increase the voltage utilization rate as compared with the over-modulation pulse width modulation control. Further, the one-pulse control performs less switching than the over-modulation pulse width modulation control.

Figure 11:
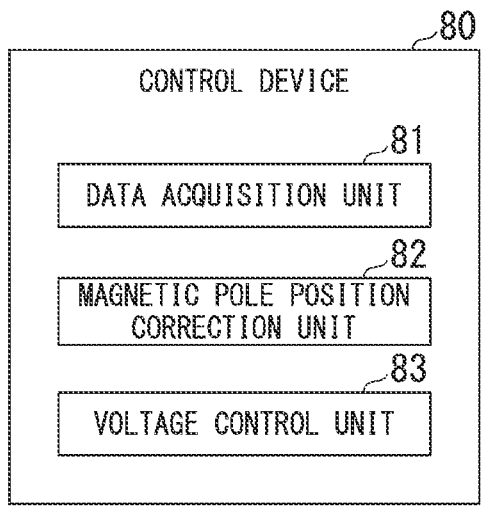
FIG. 11 is a diagram showing an example of a software configuration of a control device according to the first embodiment.

Next, the control device according to the first embodiment will be described with reference to FIG. 11. FIG. 11 is a diagram showing an example of the software configuration of the control device according to the first embodiment. As shown in FIG. 11, the control device 80 includes a voltage control unit 83, a data acquisition unit 81, and a magnetic pole position correction unit 82.

At least a part of the functions included in the control device 80 is realized by, for example, a hardware processor such as a central processing unit (CPU) executing a control program realized as software. At least a part of these components may be realized as hardware (circuit part; including circuitry) such as a large scale integration (LSI), an application specific integrated circuit (ASIC), a field-programmable gate array (FPGA), or a graphics processing unit (GPU) or may be realized by the cooperation of software and hardware.

The data acquisition unit 81 acquires the angular velocity data and the required torque data at least once. The angular velocity data is data indicating the angular velocity of the rotor, and is generated by the magnetic pole position detector 14 measuring the angular velocity of the rotor. The required torque data is data indicating the torque required for the rotating electric machine 12, and is generated by, for example, the control device 80.

The magnetic pole position correction unit 82 determines whether the state in which the angular velocity indicated by the angular velocity data is within a predetermined range has continued for a predetermined period or longer. Further, it is preferable that the magnetic pole position correction unit 82 acquires the angular velocity data a plurality of times and executes the determination based on the plurality of pieces of angular velocity data.

The magnetic pole position correction unit 82 determines whether the torque indicated by the torque data can be regarded as zero. Further, it is preferable that the magnetic pole position correction unit 82 acquires torque data a plurality of times and executes the determination based on the plurality of pieces of torque data.

Figure 12:
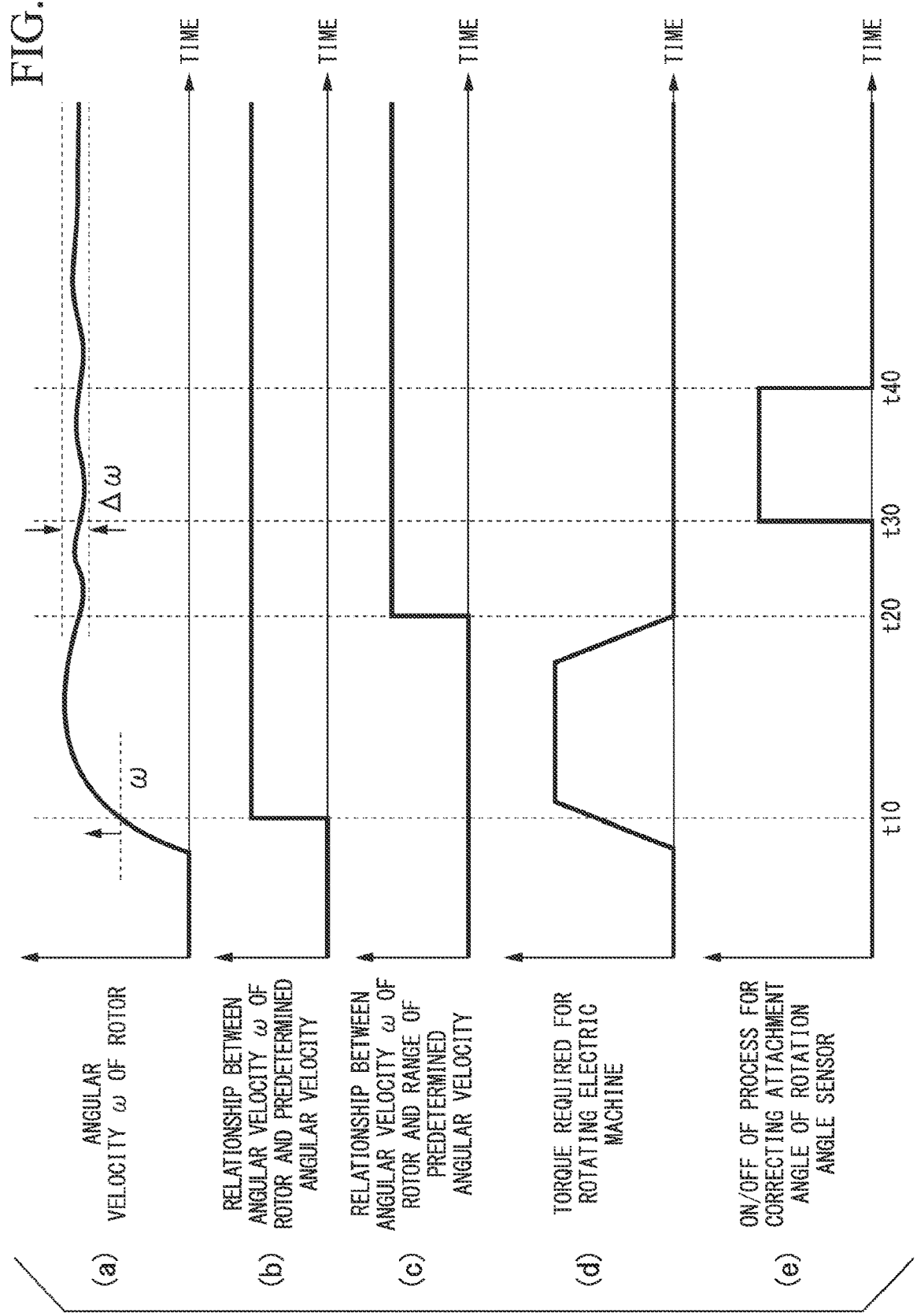
FIG. 12 is a diagram showing examples of changes over time in the angular velocity of the rotor according to the first embodiment, a period during which the angular velocity of the rotor is equal to or higher than a predetermined angular velocity, a period during which the angular velocity of the rotor is within the range of the predetermined angular velocity, changes over time in torque required for the rotating electric machine, and a period during which the process for correcting the magnetic pole position detected by the magnetic pole position detector is executed.

FIG. 12 is a diagram showing examples of changes over time in the angular velocity of the rotor according to the first embodiment, a period during which the angular velocity of the rotor is equal to or higher than a predetermined angular velocity, a period during which the angular velocity of the rotor is within the range of the predetermined angular velocity, changes over time in torque required for the rotating electric machine, and a period during which the process for correcting the magnetic pole position detected by the magnetic pole position detector is executed.

In FIG. 12(a), the horizontal axis represents time, and the vertical axis represents the change over time in the angular velocity ω of the rotor. In FIG. 12(b), the horizontal axis represents time, and the vertical axis indicates the relationship between the angular velocity ω of the rotor and a predetermined angular velocity. In FIG. 12(c), the horizontal axis represents time, and the vertical axis indicates the relationship between the angular velocity ω of the rotor and the range of a predetermined angular velocity. In FIG. 12(d), the horizontal axis represents time and the vertical axis represents the torque required for the rotating electric machine 12. In FIG. 12(e), the horizontal axis represents time, and the on/off of the process for correcting the magnetic pole position detected by the magnetic pole position detector is shown. Further, the horizontal axis in FIGS. 12(a) to 12(e) represents a common time.

For example, as shown in FIG. 12(a), the angular velocity ω of the rotor becomes equal to or higher than the predetermined angular velocity at time t10, and is within the predetermined range Δω after time t20. FIG. 12(b) shows that the angular velocity ω of the rotor is equal to or higher than the predetermined angular velocity due to switching from low to high at time t10. FIG. 12(c) shows that the angular velocity ω of the rotor is within the predetermined range Δω due to switching from low to high at time t30. For example, the magnetic pole position correction unit 82 determines that the state in which the angular velocity indicated by the angular velocity data is within the predetermined range has continued for a predetermined period or longer at time t30 when a predetermined period has elapsed from time t20.

FIG. 12(d) shows that the torque required for the rotating electric machine 12 starts to increase a little before time t10, becomes a constant torque a little after time t10, starts to decrease a little before time t20, and becomes the torque that can be regarded as zero at time t20. This is because the rotating electric machine 12 that has received the torque request drives the engine 20, and after time t20 after the start of the engine 20 is completed, the rotating electric machine 12 is rotated by the engine 20 in the idling state, and thus, the torque required for the rotating electric machine 12 can be set to zero. The magnetic pole position correction unit 82 determines that the torque indicated by the torque data can be regarded as zero at time t30 when a predetermined period has elapsed from time t20.

FIG. 12(e) shows that the angular velocity ω of the rotor is equal to or higher than the predetermined angular velocity, the angular velocity ω of the rotor is within the predetermined range Δω, and the process for correcting the magnetic pole position detected by the magnetic pole position detector 14 is executed between time t30 and time t40 when the state in which the torque required for the rotating electric machine 12 can be regarded as zero is created. The details of the process will be described later.

The voltage control unit 83 executes a process of controlling a component in the d-axis direction and a component in the q-axis direction of the voltage applied to the rotating electric machine 12. For example, the voltage control unit 83 executes a process of controlling the inverter 38 so that the component in the d-axis direction of the voltage applied to the rotating electric machine 12 becomes zero. Further, it is preferable that the voltage control unit 83 executes the process when the rotor is rotated by an external force applied from the outside of the rotating electric machine 12. Examples of when the rotor is rotated by an external force applied from the outside of the rotating electric machine 12 includes when the engine 20 is in the idling state without generating torque in the rotating electric machine 12, when the rotor is rotated by the engine 20 connected to the rotating electric machine 12, and when the vehicle 1 is traveling downhill only by gravity, and the rotor is rotated by the drive wheels 60A and 60B.

The data acquisition unit 81 determines whether a predetermined period has elapsed since the process of controlling the inverter 38 so that the component in the d-axis direction of the voltage applied to the rotating electric machine 12 becomes zero is completed. This process is executed in order to wait until the state of the rotating electric machine 12 generated by the process becomes stable.

Then, the data acquisition unit 81 acquires q-axis current data indicating the component in the q-axis direction of the current flowing through the rotating electric machine 12 when the component in the d-axis direction of the voltage applied to the rotating electric machine 12 is equal to or less than a predetermined voltage. Further, the data acquisition unit 81 acquires d-axis current data indicating the component in the d-axis direction of the current flowing through the rotating electric machine 12 when the component in the d-axis direction of the voltage applied to the rotating electric machine 12 is equal to or lower than a predetermined voltage.

Further, the data acquisition unit 81 acquires the angular velocity data indicating the angular velocity of the rotor, the d-axis inductance data indicating the component in the d-axis direction of the inductance of the rotating electric machine 12, the q-axis inductance data indicating the component in the q-axis direction of the inductance of the rotating electric machine 12, and the voltage radius data indicating the voltage radius of the rotating electric machine 12.

The magnetic pole position correction unit 82 determines a correction amount of the magnetic pole position detected by the magnetic pole position detector 14 satisfying the condition that the current indicated by the q-axis current data is equal to or less than a predetermined current based on the q-axis current data and the d-axis current data. For example, the magnetic pole position correction unit 82 determines the correction amount using Equation (3) below. Equation (3) includes a correction amount $\theta_{ofs}$ of the magnetic pole position detected by the magnetic pole position detector 14, an angular velocity ω of the rotor, a component $L_d$ in the d-axis direction of the inductance of the rotating electric machine 12, a component $L_q$ in the q-axis direction of the inductance of the rotating electric machine 12, a current $i_d'$ indicated by the d-axis current data, a current $i_q'$ indicated by the q-axis current data, and a voltage radius v. These physical quantities are also shown in FIG. 4. Equation (3) is an equation derived from the geometric relationship shown in FIG. 4.

[Math. 3]

$$\theta_{ofs}=\tan^{-1}(\omega L_q i_q'/(v-\omega L_d i_d'))  \quad (3)$$

The magnetic pole position correction unit 82 corrects the magnetic pole position detected by the magnetic pole position detector 14 based on the above-mentioned correction amount. For example, the magnetic pole position correction unit 82 corrects the magnetic pole position detected by the magnetic pole position detector 14 based on the correction amount determined using Equation (3).

Figure 13:
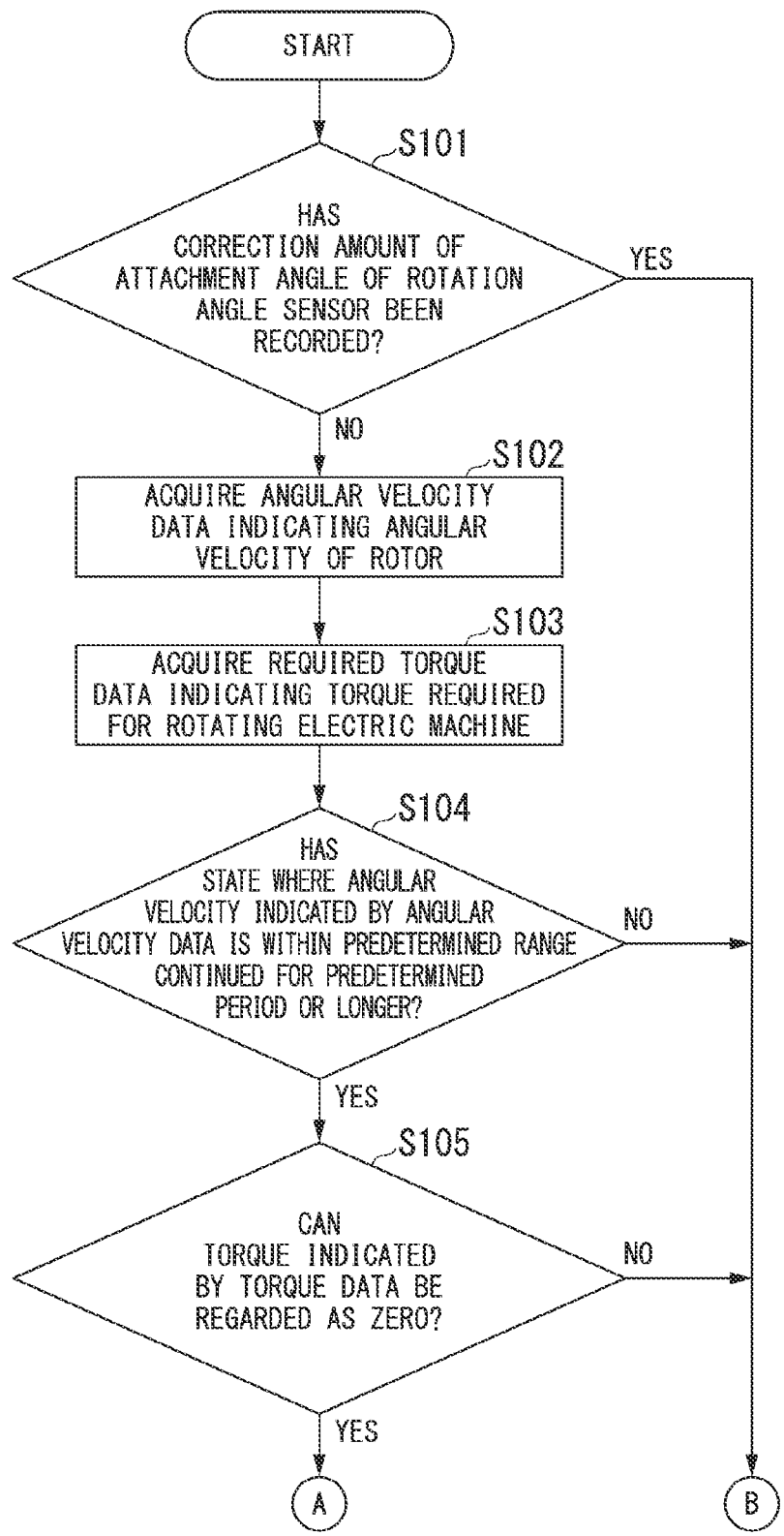
FIG. 13 is a flowchart showing an example of a process executed by the control device according to the first embodiment.
Figure 14:
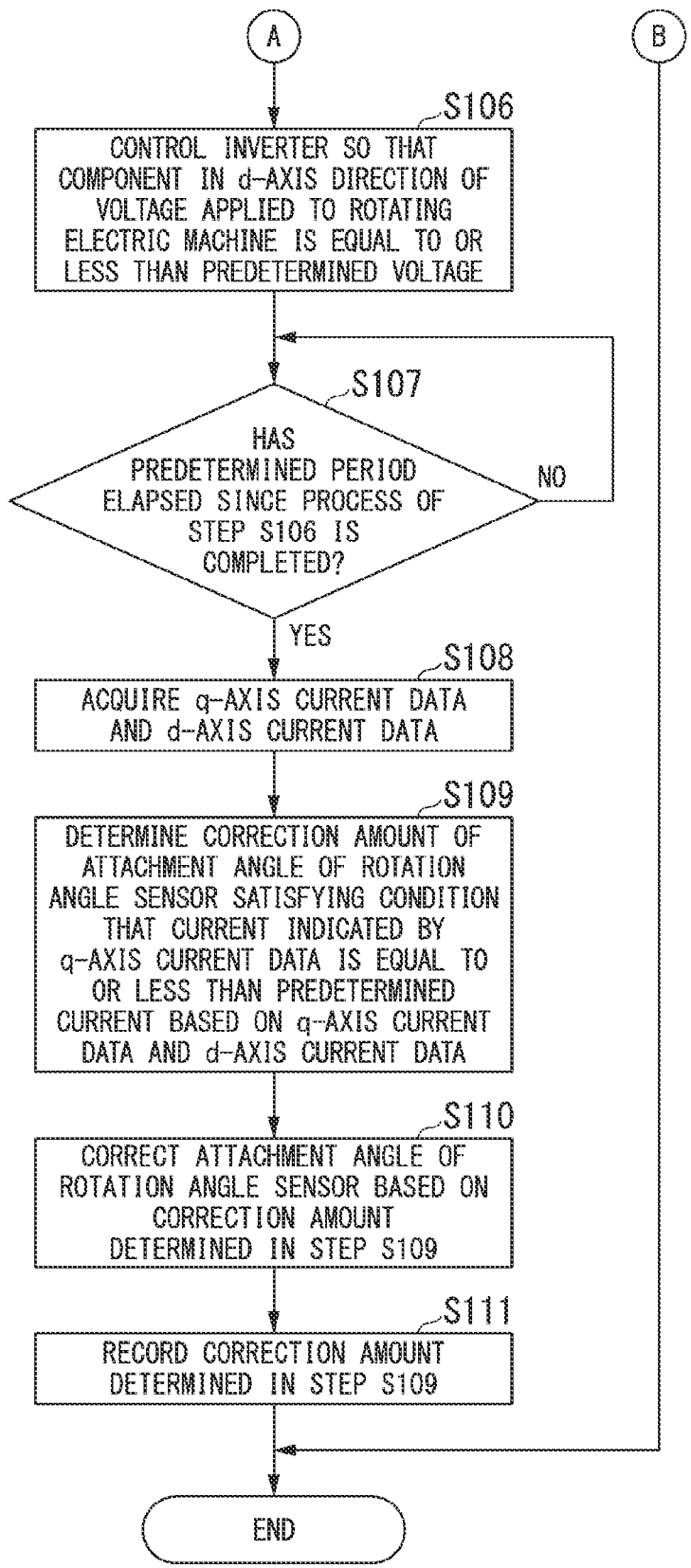
FIG. 14 is a flowchart showing an example of a process executed by the control device according to the first embodiment.

Next, the process executed by the control device 80 according to the first embodiment will be described with reference to FIGS. 13 and 14. FIGS. 13 and 14 are flowcharts showing an example of the process executed by the control device according to the first embodiment. The flowchart shown in FIG. 13 and the flowchart shown in FIG. 14 are connected by a combiner A and a combiner B.

In step S101, the control device 80 determines whether the correction amount of the magnetic pole position detected by the magnetic pole position detector 14 is recorded. When the control device 80 determines that the correction amount of the magnetic pole position detected by the magnetic pole position detector 14 is not recorded (step S101: NO), the process proceeds to step S102. On the other hand, when the control device 80 determines that the correction amount of the magnetic pole position detected by the magnetic pole position detector 14 is recorded (step S101: YES), the control device 80 ends the process.

In step S102, the data acquisition unit 81 acquires angular velocity data indicating the angular velocity of the rotor.

In step S103, the data acquisition unit 81 acquires the required torque data indicating the torque required for the rotating electric machine 12.

In step S104, the magnetic pole position correction unit 82 determines whether the state in which the angular velocity indicated by the angular velocity data is within a predetermined range has continued for a predetermined period or longer. When the magnetic pole position correction unit 82 determines that the state in which the angular velocity indicated by the angular velocity data is within a predetermined range has continued for a predetermined period or longer (step S104: YES), the process proceeds to step S105. On the other hand, when the magnetic pole position correction unit 82 determines that the state in which the angular velocity indicated by the angular velocity data is within the predetermined range does not continue for a predetermined period or longer (step S104: NO), the process is terminated.

In step S105, the magnetic pole position correction unit 82 determines whether the torque indicated by the torque data can be regarded as zero. When the magnetic pole position correction unit 82 determines that the torque indicated by the torque data can be regarded as zero (step S105: YES), the process proceeds to step S106. On the other hand, when the magnetic pole position correction unit 82 determines that the torque indicated by the torque data cannot be regarded as zero (step S105: NO), the process is terminated.

In step S106, the voltage control unit 83 controls the inverter 38 so that the component in the d-axis direction of the voltage applied to the rotating electric machine 12 at the voltage phase of δ=90 degrees becomes a predetermined voltage or less, and the component in the q-axis direction becomes a predetermined value.

In step S107, the data acquisition unit 81 determines whether a predetermined period has elapsed since the process of step S106 is completed. When the data acquisition unit 81 determines that a predetermined period has elapsed since the process in step S106 is completed (step S107: YES), the process proceeds to step S108. On the other hand, when the data acquisition unit 81 determines that a predetermined period has not elapsed since the process of step S106 is completed (step S107: NO), it is waited until it is determined that a predetermined period has elapsed since the process of step S106 is completed.

In step S108, the data acquisition unit 81 acquires the q-axis current data and the d-axis current data.

In step S109, the magnetic pole position correction unit 82 determines a correction amount of the magnetic pole position detected by the magnetic pole position detector 14 satisfying the condition that the current indicated by the q-axis current data is equal to or less than a predetermined current based on the q-axis current data and the d-axis current data.

In step S110, the magnetic pole position correction unit 82 corrects the magnetic pole position detected by the magnetic pole position detector 14 based on the correction amount determined in step S109.

In step S111, the control device 80 records the correction amount determined in step S109.

The control device 80 according to the first embodiment has been described above. The control device 80 includes the data acquisition unit 81, the magnetic pole position correction unit 82, and the voltage control unit 83. The voltage control unit 83 controls the inverter 38 so that the component in the d-axis direction of the voltage applied to the rotating electric machine 12 is equal to or less than a predetermined voltage. The data acquisition unit 81 acquires the q-axis current data indicating the component in the q-axis direction of the current flowing through the rotating electric machine 12 and the d-axis current data indicating the component in the d-axis direction of the current flowing through the rotating electric machine 12 when the component in the d-axis direction of the voltage applied to the rotating electric machine 12 is equal to or less than a predetermined voltage. The magnetic pole position correction unit 82 determines the correction amount of the magnetic pole position detected by the magnetic pole position detector 14 satisfying the condition that the current indicated by the q-axis current data is equal to or less than a predetermined current based on the q-axis current data and the q-axis current data and corrects the magnetic pole position detected by the magnetic pole position detector 14 based on the correction amount.

In this way, the control device 80 can determine the correction amount of the magnetic pole position detected by the magnetic pole position detector 14 without executing the control to make the current flowing in the q-axis direction zero. Therefore, the control device 80 can correct the magnetic pole position detected by the magnetic pole position detector 14 even when the rotation speed of the rotating electric machine 12 is relatively high.

Further, the control device 80 acquires the angular velocity data indicating the angular velocity of the rotor a plurality of times. Then, the control device 80 determines whether the state in which the angular velocity of the rotor is within the predetermined range has continued for a predetermined period or longer based on the plurality of pieces of angular velocity data, and determines the correction amount when it is determined that the state in which the angular velocity of the rotor is within the predetermined range has continued for the predetermined period or longer.

In this way, the control device 80 determines the correction amount of the magnetic pole position detected by the magnetic pole position detector 14 in a state where the angular velocity of the rotor is stable to a certain extent or more. Therefore, since the control device 80 determines the correction amount in a state where the angular velocity of the rotor, the temperature of the rotating electric machine 12, and the like required for determining the correction amount of the magnetic pole position detected by the magnetic pole position detector 14 are stable, it is possible to determine a more suitable correction amount.

Further, the control device 80 determines the correction amount analytically using Equation (3) based on the component in the q-axis direction of the current flowing through the rotating electric machine 12 and the component in the d-axis direction of the current flowing through the rotating electric machine 12. Therefore, the control device 80 can more accurately determine the correction amount of the magnetic pole position detected by the magnetic pole position detector 14.

Second Embodiment

The control device according to the second embodiment will be described with reference to FIG. 15. In the second embodiment, the description of the content overlapping with the first embodiment is omitted as appropriate, and the same reference numerals as those in the first embodiment are used.

The magnetic pole position correction unit 82 arbitrarily determines a provisional correction amount α of the magnetic pole position detected by the magnetic pole position detector 14 when the data acquisition unit 81 determines that the state in which the angular velocity indicated by the angular velocity data is within a predetermined range has continued for a predetermined period or longer, and the torque indicated by the torque data can be regarded as zero. Next, the voltage control unit 83 controls the inverter 38 so that the component in the d-axis direction of the voltage applied to the rotating electric machine 12 is equal to or less than a predetermined voltage. For example, the voltage control unit 83 executes a process of controlling the inverter 38 so that the component in the d-axis direction of the voltage applied to the rotating electric machine 12 becomes zero.

The data acquisition unit 81 determines whether a predetermined period has elapsed since the process of controlling the inverter 38 so that the component in the d-axis direction of the voltage applied to the rotating electric machine 12 becomes zero is completed. Then, the data acquisition unit 81 acquires the q-axis current data indicating the component in the q-axis direction of the current flowing through the rotating electric machine 12 when the component in the d-axis direction of the voltage applied to the rotating electric machine 12 is equal to or less than a predetermined voltage.

Each time the q-axis current data is acquired by the data acquisition unit 81, the magnetic pole position correction unit 82 determines whether the current indicated by the q-axis current data is equal to or less than a predetermined current. For example, the magnetic pole position correction unit 82 determines whether the current indicated by the q-axis current data is zero each time the q-axis current data is acquired by the data acquisition unit 81.

When it is determined that the current indicated by the q-axis current data is equal to or less than a predetermined current, the magnetic pole position correction unit 82 determines the provisional correction amount α of the magnetic pole position detected by the magnetic pole position detector 14 as the correction amount. For example, when it is determined that the current indicated by the q-axis current data is zero, the magnetic pole position correction unit 82 determines the provisional correction amount α of the magnetic pole position detected by the magnetic pole position detector 14 as the correction amount.

On the other hand, when it is determined that the current indicated by the q-axis current data is not equal to or less than a predetermined current, the magnetic pole position correction unit 82 redetermines the provisional correction amount α of the magnetic pole position detected by the magnetic pole position detector 14. For example, when it is determined that the current indicated by the q-axis current data is not zero, the magnetic pole position correction unit 82 redetermines the provisional correction amount α of the magnetic pole position detected by the magnetic pole position detector 14.

Figure 15:
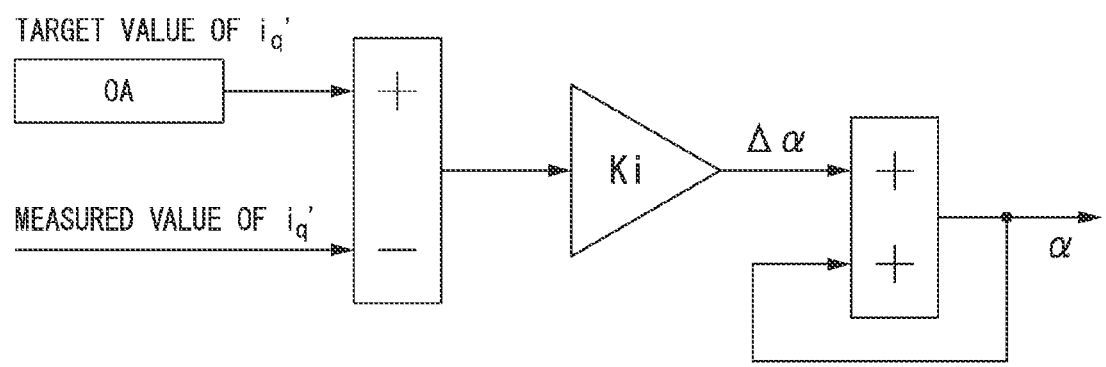
FIG. 15 is a diagram for explaining an example of a process executed by a control device according to a second embodiment to redetermine a provisional correction amount of the magnetic pole position detected by the magnetic pole position detector.

FIG. 15 is a diagram for explaining an example of a process executed by the control device according to the second embodiment to redetermine the provisional correction amount of the magnetic pole position detected by the magnetic pole position detector. First, the magnetic pole position correction unit 82 measures the current $i_q'$ recognized by the control device 80. Next, as shown in FIG. 15, for example, the magnetic pole position correction unit 82 controls the phase of the voltage applied to the rotating electric machine 12 using integral control so that the deviation between the target value of the current $i_q'$ and the measured value of the current $i_q'$ becomes zero. More specifically, the magnetic pole position correction unit 82 determines a value α+Δα obtained by adding a minute value Δα which is a difference between the phase when the current $i_q'$ becomes zero and the phase of the measured current $i_q'$ to a provisional correction amount α determined arbitrarily as a provisional correction amount, corrects the magnetic pole position based on the provisional correction amount α+Δα, and repeats the process of measuring the current $i_q'$. The magnetic pole position correction unit 82 determines the provisional correction amount α+Δα when the current $i_q'=0A$ as the final correction amount.

Then, the magnetic pole position correction unit 82 corrects the magnetic pole position detected by the magnetic pole position detector 14 based on the finally determined correction amount.

Figure 16:
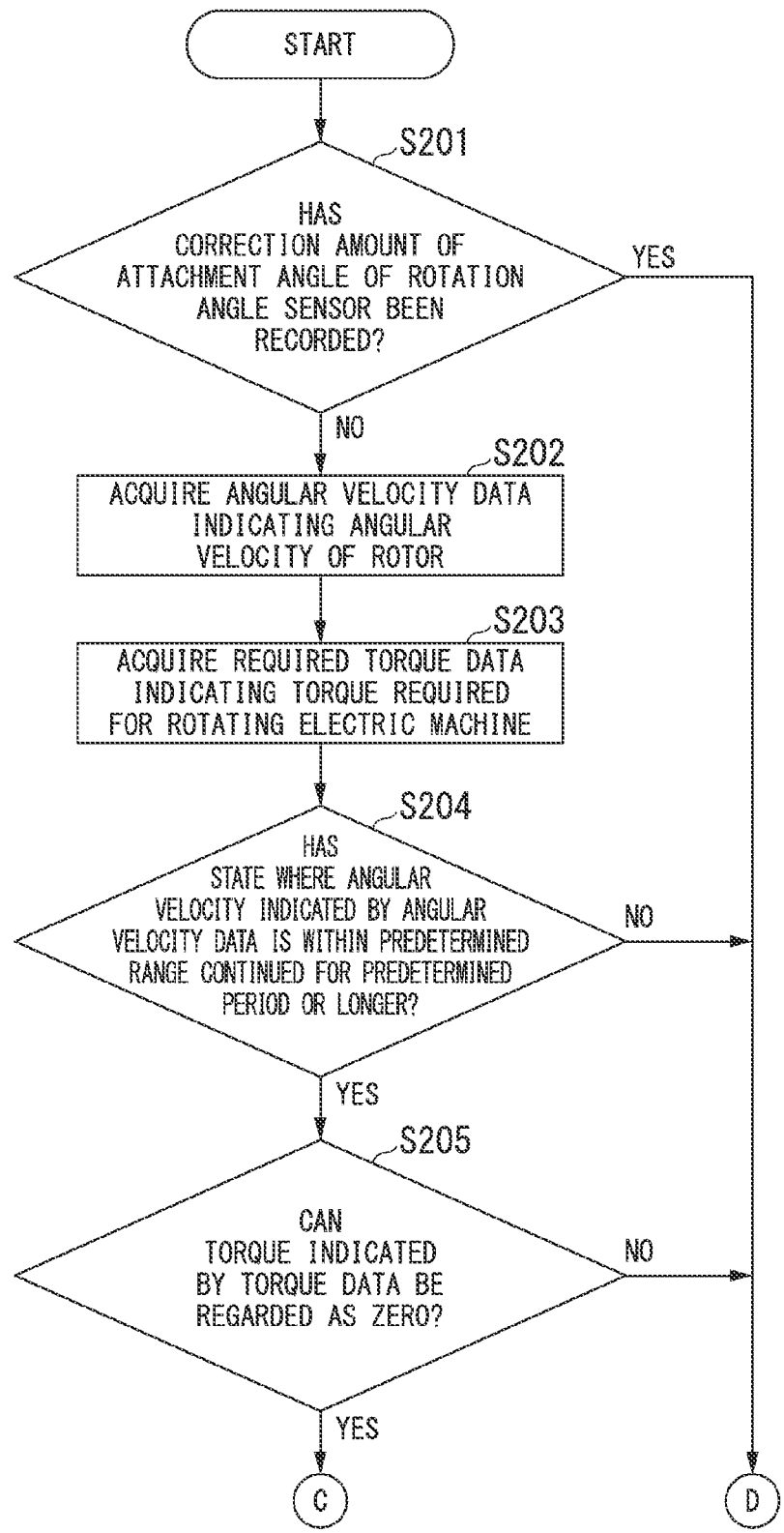
FIG. 16 is a flowchart showing an example of a process executed by the control device according to the second embodiment.
Figure 17:
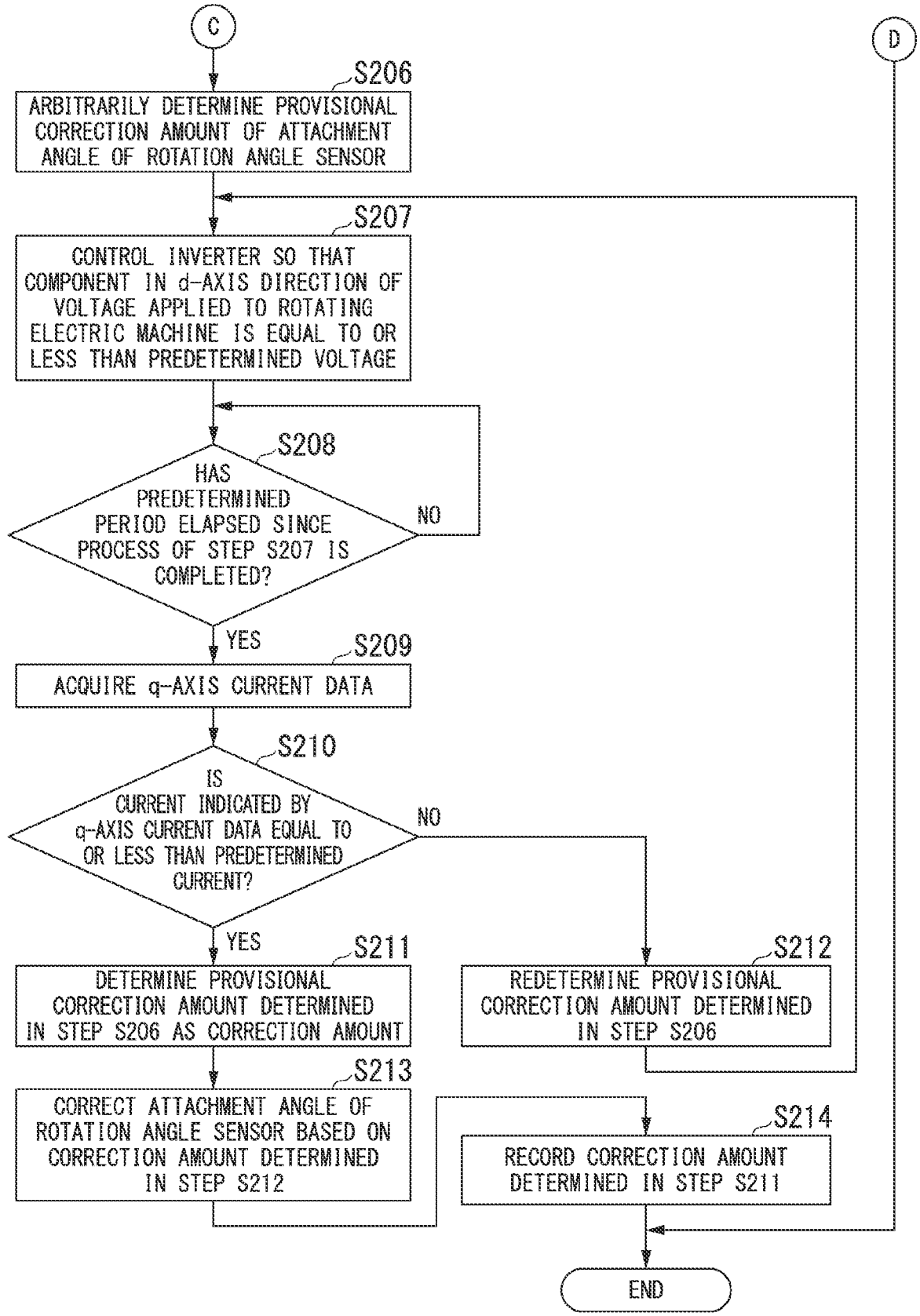
FIG. 17 is a flowchart showing an example of a process executed by the control device according to the second embodiment.

Next, the process executed by the control device 80 according to the second embodiment will be described with reference to FIGS. 16 and 17. FIGS. 16 and 17 are flowcharts showing an example of the process executed by the control device according to the second embodiment. The flowchart shown in FIG. 16 and the flowchart shown in FIG. 17 are connected by a combiner C and a combiner D.

In step S201, the control device 80 determines whether the correction amount of the magnetic pole position detected by the magnetic pole position detector 14 is recorded. When the control device 80 determines that the correction amount of the magnetic pole position detected by the magnetic pole position detector 14 is not recorded (step S201: NO), the process proceeds to step S202. On the other hand, when the control device 80 determines that the correction amount of the magnetic pole position detected by the magnetic pole position detector 14 is recorded (step S201: YES), the control device 80 ends the process.

In step S202, the data acquisition unit 81 acquires angular velocity data indicating the angular velocity of the rotor.

In step S203, the data acquisition unit 81 acquires the required torque data indicating the torque required for the rotating electric machine 12.

In step S204, the magnetic pole position correction unit 82 determines whether the state in which the angular velocity indicated by the angular velocity data is within a predetermined range has continued for a predetermined period or longer. When the magnetic pole position correction unit 82 determines that the state in which the angular velocity indicated by the angular velocity data is within a predetermined range has continued for a predetermined period or longer (step S204: YES), the process proceeds to step S205. On the other hand, when the magnetic pole position correction unit 82 determines that the state in which the angular velocity indicated by the angular velocity data is within the predetermined range does not continue for a predetermined period or longer (step S204: NO), the process is terminated.

In step S205, the magnetic pole position correction unit 82 determines whether the torque indicated by the torque data can be regarded as zero. When the magnetic pole position correction unit 82 determines that the torque indicated by the torque data can be regarded as zero (step S205: YES), the process proceeds to step S206. On the other hand, when the magnetic pole position correction unit 82 determines that the torque indicated by the torque data cannot be regarded as zero (step S205: NO), the process is terminated.

In step S206, the magnetic pole position correction unit 82 arbitrarily determines the provisional correction amount $\alpha$ of the magnetic pole position detected by the magnetic pole position detector 14. The provisional correction amount $\alpha$ in this case may be, for example, zero.

In step S207, the voltage control unit 83 controls the inverter 38 so that the component in the d-axis direction of the voltage applied to the rotating electric machine 12 at the voltage phase of $\delta=90$ degrees becomes a predetermined voltage or less, and the component in the d-axis direction becomes a predetermined value.

In step S208, the data acquisition unit 81 determines whether a predetermined period has elapsed since the process of step S207 is completed. When the data acquisition unit 81 determines that a predetermined period has elapsed since the process in step S207 is completed (step S208: YES), the process proceeds to step S209. On the other hand, when the data acquisition unit 81 determines that a predetermined period has not elapsed since the process of step S207 is completed (step S208: NO), it is waited until it is determined that a predetermined period has elapsed since the process of step S207 is completed.

In step S209, the data acquisition unit 81 acquires the q-axis current data.

In step S210, the magnetic pole position correction unit 82 determines whether the current indicated by the q-axis current data is equal to or less than a predetermined current. When the magnetic pole position correction unit 82 determines that the current indicated by the q-axis current data is equal to or less than a predetermined current (step S210: YES), the process proceeds to step S211. On the other hand, when the magnetic pole position correction unit 82 determines that the current indicated by the q-axis current data is not equal to or less than a predetermined current (step S210: NO), the process proceeds to step S212.

In step S211 the magnetic pole position correction unit 82 determines the provisional correction amount determined in step S206 as the correction amount.

In step S212, the magnetic pole position correction unit 82 calculates a minute value $\Delta\alpha$ which is the difference between the phase when the current $i_q'$ becomes zero and the phase of the measured current $i_q'$, and determines a value $\alpha+\Delta\alpha$ obtained by adding the calculated minute value $\Delta\alpha$ to the provisional correction amount $\alpha$ determined in step S206 as a new provisional correction amount, and the process returns to step S207.

In step S213, the magnetic pole position correction unit 82 corrects the magnetic pole position based on the correction amount determined in step S212.

In step S214, the control device 80 records the correction amount determined in step S214.

The control device 80 according to the second embodiment has been described above. The control device 80 includes the data acquisition unit 81 and the magnetic pole position correction unit 82. The data acquisition unit 81 acquires the q-axis current data at least once. The magnetic pole position correction unit 82 arbitrarily determines a provisional correction amount $\alpha$ of the magnetic pole position detected by the magnetic pole position detector 14, and determines whether the current indicated by the q-axis current data is equal to or less than a predetermined current each time the q-axis current data is acquired by the data acquisition unit 81. Then, when it is determined that the current indicated by the q-axis current data is equal to or less than a predetermined current, the magnetic pole position correction unit 82 determines the provisional correction amount $\alpha$ as the correction amount. On the other hand, when it is determined that the current indicated by the q-axis current data exceeds a predetermined current, the magnetic pole position correction unit 82 redetermines the provisional correction amount $\alpha$.

In this way, the control device 80 can determine the correction amount with higher accuracy according to the state such as the temperature of the rotating electric machine 12 determined by the environment in which the rotating electric machine 12 is used.

Third Embodiment

The control device according to the third embodiment will be described with reference to FIG. 18. The control device 80 according to the third embodiment is different from the control device 80 of the second embodiment in that a process of correcting the provisional correction amount determined by the same method as the control device 80 according to the second embodiment based on the current indicated by the d-axis current data and the electrical resistance of the winding of the stator. Therefore, in the third embodiment, the description of the content overlapping with at least one of the first embodiment and the second embodiment is appropriately omitted, and the same reference numerals as those of the first embodiment and the second embodiment are used.

The magnetic pole position correction unit 82 arbitrarily determines the provisional correction amount $\alpha$ of the magnetic pole position detected by the magnetic pole position detector 14 when the data acquisition unit 81 determines that the state in which the angular velocity indicated by the angular velocity data is within a predetermined range has continued for a predetermined period or longer, and the torque indicated by the torque data can be regarded as zero. Next, the voltage control unit 83 controls the inverter 38 so that the component in the d-axis direction of the voltage applied to the rotating electric machine 12 is equal to or less than a predetermined voltage.

The data acquisition unit 81 determines whether a predetermined period has elapsed since the process of controlling the inverter 38 so that the component in the d-axis direction of the voltage applied to the rotating electric machine 12 becomes zero is completed. Then, the data acquisition unit 81 acquires the q-axis current data indicating the component in the q-axis direction of the current flowing through the rotating electric machine 12 when the component in the d-axis direction of the voltage applied to the rotating electric machine 12 is equal to or less than a predetermined voltage.

Each time the q-axis current data is acquired by the data acquisition unit 81, the magnetic pole position correction unit 82 determines whether the current indicated by the q-axis current data is equal to or less than a predetermined current. When it is determined that the current indicated by the q-axis current data is equal to or less than a predetermined current, the magnetic pole position correction unit 82 determines the provisional correction amount α of the magnetic pole position detected by the magnetic pole position detector 14 as the correction amount. On the other hand, when it is determined that the current indicated by the q-axis current data is not equal to or less than a predetermined current, the magnetic pole position correction unit 82 redetermines the provisional correction amount α of the magnetic pole position detected by the magnetic pole position detector 14.

When it is determined that the current indicated by the q-axis current data is equal to or less than a predetermined current, and the provisional correction amount α of the magnetic pole position detected by the magnetic pole position detector 14 is finally determined, the data acquisition unit 81 acquires the d-axis current data indicating the component in the d-axis direction of the current flowing through the rotating electric machine 12.

The magnetic pole position correction unit 82 corrects the provisional correction amount α finally determined based on the current indicated by the d-axis current data and the electrical resistance of the winding. FIG. 18 is a vector diagram for explaining an example of a process executed by the control device according to the third embodiment to correct the provisional correction amount of the magnetic pole position detected by the magnetic pole position detector. FIG. 18 shows the contribution to the error in the magnetic pole position detected by the magnetic pole position detector 14 of the product of the current $i_d'$ indicated by the d-axis current data and the electrical resistance of the winding.

Figure 18:
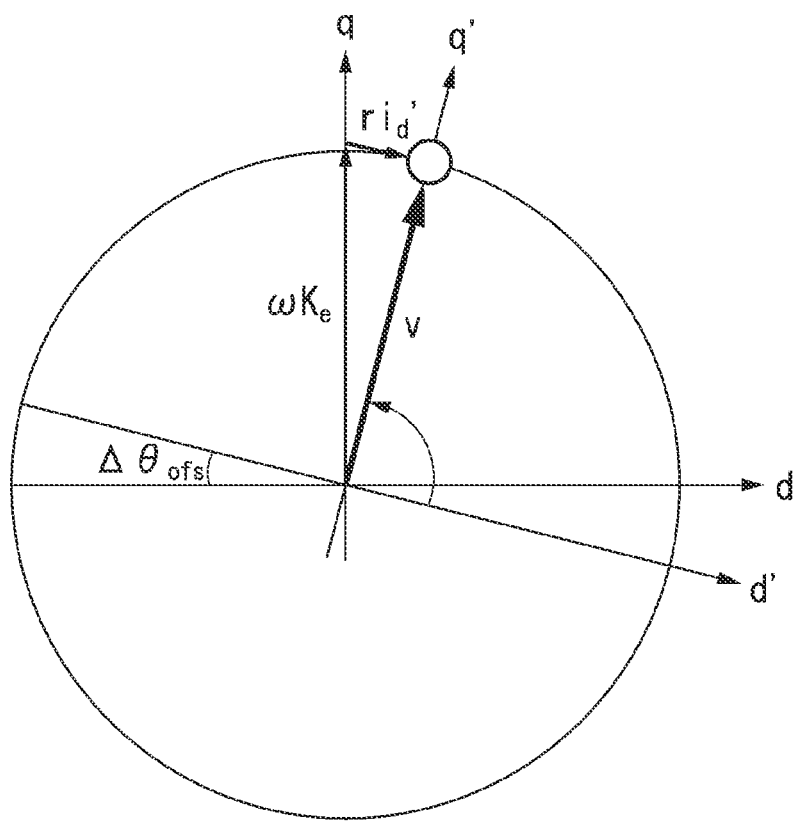
FIG. 18 is a vector diagram for explaining an example of a process executed by a control device according to a third embodiment to correct the provisional correction amount of the magnetic pole position detected by the magnetic pole position detector.

When the error in the magnetic pole position of the magnetic pole position detected by the magnetic pole position detector 14 is zero, the rotating electric machine 12 is operated at the voltage phase of δ=90 degrees, and the phase current of the three-phase alternating current supplied to the rotating electric machine 12 is zero, a counter-electromotive voltage represented by a vector ωKe shown in FIG. 18 is generated. Further, in such a case, the d-axis and the q-axis recognized by the control device 80 are the d'-axis and the q'-axis shown in FIG. 18, respectively. The d'-axis is an axis obtained by rotating the d-axis counterclockwise by the contribution $\Delta\theta_{ofs}$ of the product to the error in the magnetic pole position detected by the magnetic pole position detector 14. The q'-axis is an axis obtained by rotating the q-axis counterclockwise by the contribution $\Delta\theta_{ofs}$ of the product to the error in the magnetic pole position detected by the magnetic pole position detector 14.

The following equation (4) is derived from the geometric relationship shown in FIG. 4. Equation (4) includes a contribution $\Delta\theta_{ofs}$ to the error in the magnetic pole position detected by the magnetic pole position detector 14 of the product of the current indicated by the d-axis current data and the electrical resistance of the winding, an electrical resistance r of the winding of the stator, a current $i_d'$ indicated by the d-axis current data, and a voltage radius v.

[Math. 4]

$$\Delta\theta_{ofs} = \tan^{-1}(ri_d'/V) \quad (4)$$

The magnetic pole position correction unit 82 determines the contribution $\Delta\theta_{ofs}$ of the product to the error in the magnetic pole position detected by the magnetic pole position detector 14 using Equation (4), and determines a provisional correction amount $\alpha+\Delta\theta_{ofs}$ corrected by adding the contribution $\Delta\theta_{ofs}$ to the provisional correction amount α of the magnetic pole position detected by the magnetic pole position detector 14 as a correction amount. Then, the magnetic pole position correction unit 82 corrects the magnetic pole position detected by the magnetic pole position detector 14 based on the correction amount.

Figure 19:
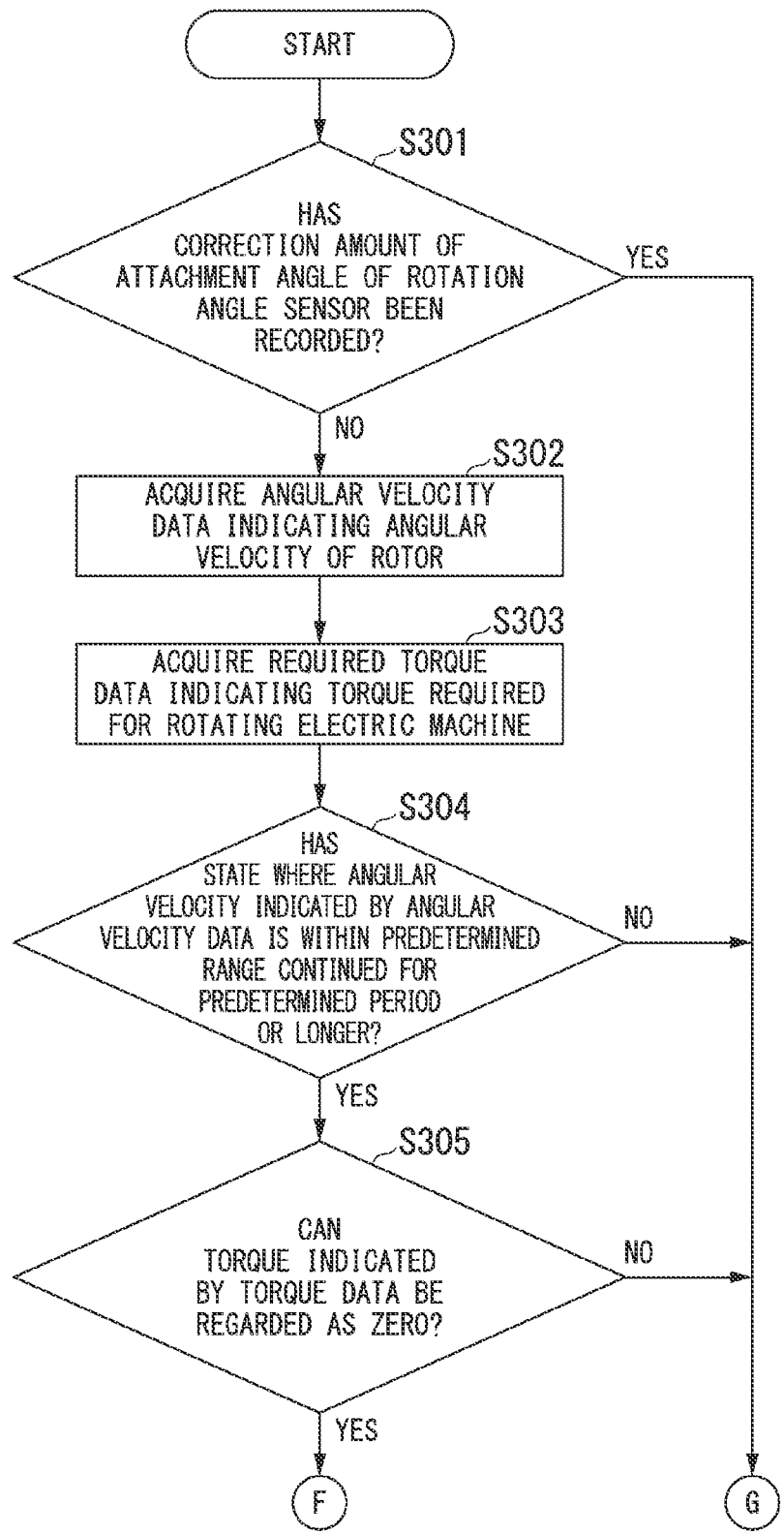
FIG. 19 is a flowchart showing an example of a process executed by the control device according to the third embodiment.
Figure 20:
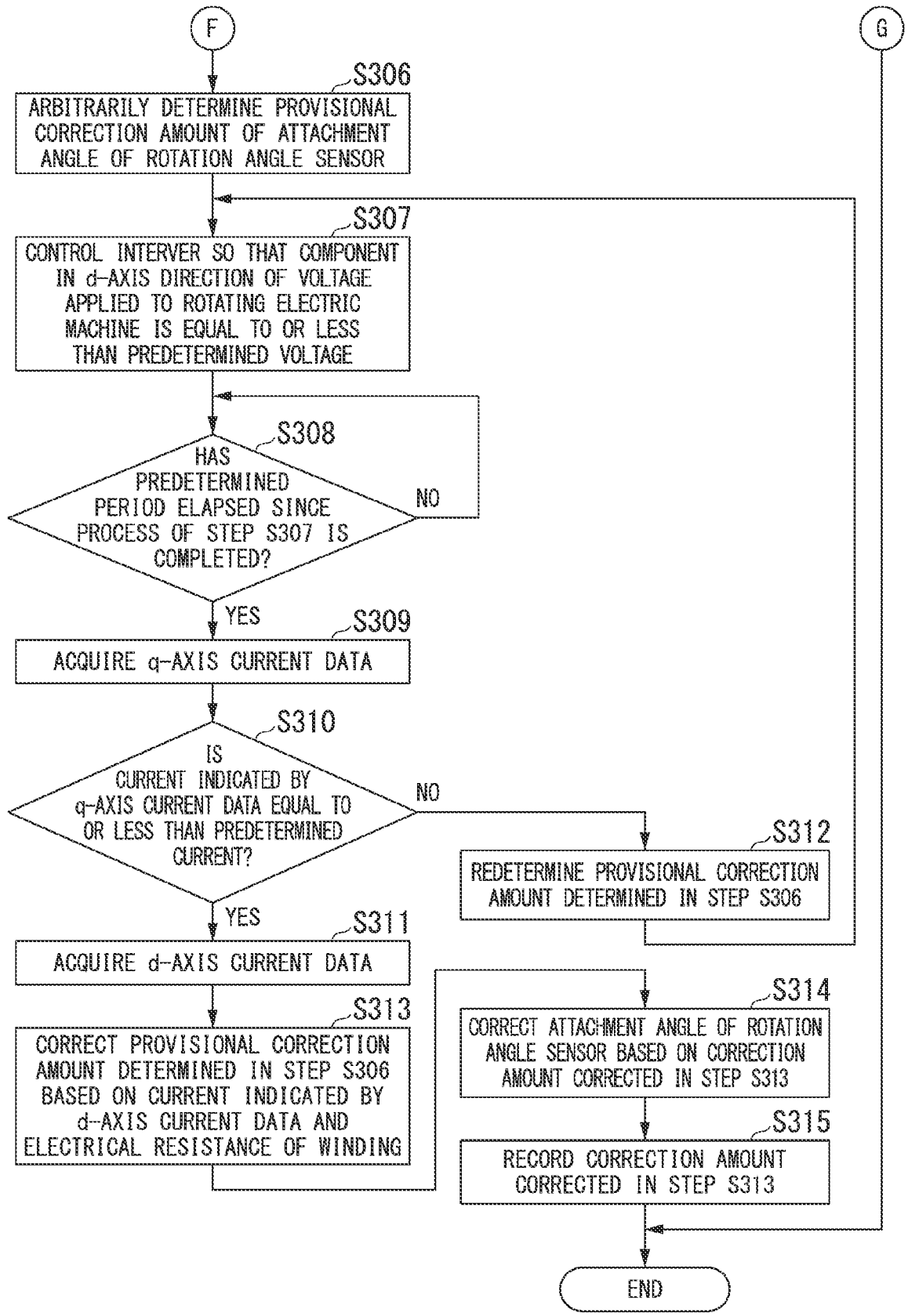
FIG. 20 is a flowchart showing an example of a process executed by the control device according to the third embodiment.

Next, the process executed by the control device 80 according to the third embodiment will be described with reference to FIGS. 19 and 20. FIGS. 19 and 20 are flowcharts showing an example of the process executed by the control device according to the third embodiment. The flowchart shown in FIG. 19 and the flowchart shown in FIG. 20 are connected by a combiner F and a combiner G.

In step S301, the control device 80 determines whether the correction amount of the magnetic pole position detected by the magnetic pole position detector 14 is recorded. When the control device 80 determines that the correction amount of the magnetic pole position detected by the magnetic pole position detector 14 is not recorded (step S301: NO), the process proceeds to step S302. On the other hand, when the control device 80 determines that the correction amount of the magnetic pole position detected by the magnetic pole position detector 14 is recorded (step S301: YES), the process is terminated.

In step S302, the data acquisition unit 81 acquires angular velocity data indicating the angular velocity of the rotor.

In step S303, the data acquisition unit 81 acquires the required torque data indicating the torque required for the rotating electric machine 12.

In step S304, the magnetic pole position correction unit 82 determines whether the state in which the angular velocity indicated by the angular velocity data is within a predetermined range has continued for a predetermined period or longer. When the magnetic pole position correction unit 82 determines that the state in which the angular velocity indicated by the angular velocity data is within a predetermined range has continued for a predetermined period or longer (step S304: YES), the process proceeds to step S305. On the other hand, when the magnetic pole position correction unit 82 determines that the state in which the angular velocity indicated by the angular velocity data is within the predetermined range does not continue for a predetermined period or longer (step S304: NO), the process is terminated.

In step S305, the magnetic pole position correction unit 82 determines whether the torque indicated by the torque data can be regarded as zero. When the magnetic pole position correction unit 82 determines that the torque indicated by the torque data can be regarded as zero (step S305: YES), the process proceeds to step S306. On the other hand, when the magnetic pole position correction unit 82 determines that the torque indicated by the torque data cannot be regarded as zero (step S305: NO), the process is terminated.

In step S306, the magnetic pole position correction unit 82 arbitrarily determines the provisional correction amount of the magnetic pole position detected by the magnetic pole position detector 14.

In step S307, the voltage control unit 83 controls the inverter 38 so that the component in the d-axis direction of the voltage applied to the rotating electric machine 12 at the voltage phase of δ=90 degrees becomes a predetermined voltage or less, and the component in the q-axis direction becomes a predetermined value.

In step S308, the data acquisition unit 81 determines whether a predetermined period has elapsed since the process of step S307 is completed. When the data acquisition unit 81 determines that a predetermined period has elapsed since the process in step S307 is completed (step S308: YES), the process proceeds to step S309. On the other hand, when the data acquisition unit 81 determines that the predetermined period has not elapsed since the process of step S307 is completed (step S308: NO), it is waited until it is determined that a predetermined period has elapsed since the process of step S307 is completed.

In step S309, the data acquisition unit 81 acquires the q-axis current data.

In step S310, the magnetic pole position correction unit 82 determines whether the current indicated by the q-axis current data is equal to or less than a predetermined current. When the magnetic pole position correction unit 82 determines that the current indicated by the q-axis current data is equal to or less than a predetermined current (step S310: YES), the process proceeds to step S311. On the other hand, when the magnetic pole position correction unit 82 determines that the current indicated by the q-axis current data is less than a predetermined current (step S310: NO), the process proceeds to step S312.

In step S311, the magnetic pole position correction unit 82 acquires d-axis current data.

In step S312, the magnetic pole position correction unit 82 calculates a minute value $\Delta\alpha$ which is the difference between the phase when the current $i_q'$ becomes zero and the phase of the measured current $i_q'$, and determines a value $\alpha + \Delta\alpha$ obtained by adding the calculated minute value $\Delta\alpha$ to the provisional correction amount $\alpha$ determined in step S306 as a new provisional correction amount, and the process returns to step S307.

In step S313, the magnetic pole position correction unit 82 corrects the provisional correction amount determined in step S306 based on the current indicated by the d-axis current data and the electrical resistance of the winding.

In step S314, the magnetic pole position correction unit 82 corrects the magnetic pole position detected by the magnetic pole position detector 14 based on the correction amount corrected in step S313.

In step S315, the control device 80 records the correction amount corrected in step S313.

The control device 80 according to the third embodiment has been described above. The control device 80 includes the data acquisition unit 81 and the magnetic pole position correction unit 82. When it is determined that the current indicated by the q-axis current data is equal to or less than a predetermined current, the data acquisition unit 81 acquires d-axis current data indicating a component in the d-axis direction of the current flowing through the rotating electric machine 12. The magnetic pole position correction unit 82 corrects the provisional correction amount based on the current indicated by the d-axis current data and the electrical resistance of the winding, and determines the provisional correction amount corrected based on the current indicated by the d-axis current data and the electrical resistance of the winding as a correction amount.

In this way, the control device 80 can determine a correction amount with higher accuracy in consideration of the influence on the correction amount of the magnetic pole position detected by the magnetic pole position detector 14, of the electrical resistance r of the winding of the stator and the current $i_d'$ flowing in the d-axis direction.

The embodiments of the present invention have been described above with reference to the drawings. However, the control device, the storage medium, and the control method are not limited to the above-described embodiments, and at least one of various modifications, substitutions, combinations, and design changes can be made within a range without departing from the gist of the present invention.

Moreover, the effects of the embodiments of the present invention described above are the effects described as an example. Therefore, in addition to the above-mentioned effects, the embodiments of the present invention may also exert other effects that can be recognized by those skilled in the art from the description of the above-mentioned embodiments.

What is claimed is:

1. A control device comprising:
   a storage medium for storing computer-readable instructions; and
   a processor connected to the storage medium, the processor executing the computer-readable instructions to execute:
   controlling a voltage in a d-axis direction and a voltage in a q-axis direction applied to a rotating electric machine driven by an electric power supplied from an inverter, in which a d-axis is defined to be an axis indicating a magnetization direction of a magnet of a rotor including a permanent magnet and a q-axis is defined to be an axis orthogonal to the d-axis, to which a magnetic pole position detector for detecting a magnetic pole position of the rotor is attached, and which includes a stator for generating a magnetic field using a winding;
   acquiring q-axis current data indicating a component in the q-axis direction of a current flowing through the rotating electric machine when a component in the d-axis direction of the voltage applied to the rotating electric machine is equal to or less than a predetermined voltage; and
   determining, based on the q-axis current data, a correction amount of the magnetic pole position satisfying a condition that a current indicated by the q-axis current data is equal to or less than a predetermined current and correcting the magnetic pole position based on the correction amount.

2. The control device according to claim 1, wherein the processor controls the inverter so that the component in the d-axis direction of the voltage applied to the rotating electric machine when the rotor is rotated by an external force applied from the outside of the rotating electric machine is equal to or less than the predetermined voltage.

3. The control device according to claim 1,
   wherein the processor acquires angular velocity data indicating an angular velocity of the rotor a plurality of times, and
   wherein the processor determines whether a state in which the angular velocity of the rotor is within a predetermined range has continued for a predetermined period or longer based on a plurality of pieces of angular velocity data, and determines the correction amount when it is determined that the state in which the angular velocity of the rotor is within the predetermined range has continued for the predetermined period or longer.

4. The control device according to claim 1,
wherein the processor further acquires d-axis current data indicating a component in the d-axis direction of the current flowing through the rotating electric machine when the component in the d-axis direction of the voltage applied to the rotating electric machine is equal to or less than the predetermined voltage, and
wherein the processor determines the correction amount based on the d-axis current data in addition to the q-axis current data.

5. The control device according to claim 4,
wherein the processor further acquires angular velocity data indicating the angular velocity of the rotor, d-axis inductance data indicating a component in the d-axis direction of the inductance of the rotating electric machine, q-axis inductance data indicating a component in the q-axis direction of the inductance of the rotating electric machine, and voltage radius data indicating a voltage radius of the rotating electric machine, and
wherein the processor determines the correction amount using Equation (1):

$$\theta_{ofs} = \tan^{-1}(\omega L_q i_q'/(v - \omega L_d i_d')) \quad (1)$$

where $\theta_{ofs}$ represents the correction amount of the magnetic pole position, $\omega$ represents the angular velocity of the rotor, $L_d$ represents the component in the d-axis direction of the inductance of the rotating electric machine, $L_q$ represents the component in the q-axis direction of the inductance of the rotating electric machine, $i_d'$ represents the current indicated by the d-axis current data, $i_q'$ represents the current indicated by the q-axis current data, and v represents the voltage radius.

6. The control device according to claim 1,
wherein the processor acquires the q-axis current data at least once, and
wherein the processor arbitrarily determines a provisional correction amount of the magnetic pole position, determines whether the current indicated by the q-axis current data is equal to or less than a predetermined current each time the q-axis current data is acquired by the processor, and determines the provisional correction amount as the correction amount when it is determined that the current indicated by the q-axis current data is equal to or less than the predetermined current.

7. The control device according to claim 6,
wherein the processor further acquires d-axis current data indicating a component in the d-axis direction of the current flowing through the rotating electric machine when it is determined that the current indicated by the q-axis current data is equal to or less than the predetermined current, and
wherein the processor corrects the provisional correction amount based on the current indicated by the d-axis current data and an electrical resistance of the winding, and determines, as the correction amount, the provisional correction amount corrected based on the current indicated by the d-axis current data and the electrical resistance of the winding.

8. The control device according to claim 7, wherein the processor corrects the provisional correction amount using Equation (2):

$$\Delta\theta_{ofs} = \tan^{-1}(r i_d'/V) \quad (2)$$

where $\Delta\theta_{ofs}$ represents contribution to the error in the magnetic pole position, of a product of the current indicated by the d-axis current data and the electrical resistance of the winding, r represents the electrical resistance of the winding of the stator, $i_d'$ represents the current indicated by the d-axis current data, and v represents the voltage radius.

9. The control device according to claim 1,
wherein the processor acquires the q-axis current data at least once, and
wherein the processor arbitrarily determines a provisional correction amount of the magnetic pole position, determines whether a current indicated by the q-axis current data is equal to or less than a predetermined current each time the q-axis current data is acquired by the processor, and redetermines the provisional correction amount when it is determined that the current indicated by the q-axis current data exceeds the predetermined current.

10. A computer-readable non-transitory storage medium that stores a control programs for causing a computer to realize:
a voltage control function of controlling a voltage in a d-axis direction and a voltage in a q-axis direction applied to a rotating electric machine driven by an electric power supplied from an inverter, in which a d-axis is defined to be an axis indicating a magnetization direction of a magnet of a rotor including a permanent magnet and a q-axis is defined to be an axis orthogonal to the d-axis, to which a magnetic pole position detector for detecting a magnetic pole position of the rotor is attached, and which includes a stator for generating a magnetic field using a winding;
a data acquisition function of acquiring q-axis current data indicating a component in the q-axis direction of a current flowing through the rotating electric machine when a component in the d-axis direction of the voltage applied to the rotating electric machine is equal to or less than a predetermined voltage; and
a magnetic pole position correction function of determining, based on the q-axis current data, a correction amount of the magnetic pole position satisfying a condition that a current indicated by the q-axis current data is equal to or less than a predetermined current and correcting the magnetic pole position based on the correction amount.

11. A control method for causing a computer to execute:
a voltage control function of controlling a voltage in a d-axis direction and a voltage in a q-axis direction applied to a rotating electric machine driven by an electric power supplied from an inverter, in which a d-axis is defined to be an axis indicating a magnetization direction of a magnet of a rotor including a permanent magnet and a q-axis is defined to be an axis orthogonal to the d-axis, to which a magnetic pole position detector for detecting a magnetic pole position of the rotor is attached, and which includes a stator for generating a magnetic field using a winding;
a data acquisition function of acquiring q-axis current data indicating a component in the q-axis direction of a current flowing through the rotating electric machine when a component in the d-axis direction of the voltage applied to the rotating electric machine is equal to or less than a predetermined voltage; and
a magnetic pole position correction function of determining, based on the q-axis current data, a correction amount of the magnetic pole position satisfying a condition that a current indicated by the q-axis current data is equal to or less than a predetermined current and correcting the magnetic pole position based on the correction amount.

* * * * *